United States Patent
Venezia

(10) Patent No.: US 12,073,439 B2
(45) Date of Patent: Aug. 27, 2024

(54) SMART CONTRACT SYSTEM AND METHOD FOR MANAGING DIGITAL USER ENGAGEMENT

(71) Applicant: Nicholas M. Venezia, Encino, CA (US)

(72) Inventor: Nicholas M. Venezia, Encino, CA (US)

(*) Notice: Subject to any disclaimer, the term of this patent is extended or adjusted under 35 U.S.C. 154(b) by 0 days.

(21) Appl. No.: 18/005,497

(22) PCT Filed: May 31, 2022

(86) PCT No.: PCT/US2022/031600
§ 371 (c)(1),
(2) Date: Jan. 13, 2023

(87) PCT Pub. No.: WO2022/251734
PCT Pub. Date: Dec. 1, 2022

(65) Prior Publication Data
US 2023/0259981 A1 Aug. 17, 2023

(51) Int. Cl.
*G06Q 30/02* (2023.01)
*G06F 21/62* (2013.01)
*G06Q 30/0241* (2023.01)
*G06Q 30/0251* (2023.01)

(52) U.S. Cl.
CPC ..... *G06Q 30/0271* (2013.01); *G06F 21/6254* (2013.01); *G06Q 30/0277* (2013.01)

(58) Field of Classification Search
CPC ... G06V 40/171; H04L 63/20; H04L 63/0407; H04L 9/3239; G06Q 20/0658
See application file for complete search history.

(56) References Cited

U.S. PATENT DOCUMENTS

| | | |
|---|---|---|
| 5,892,900 A | 4/1999 | Ginter |
| 10,540,654 B1 | 1/2020 | James |
| 10,546,296 B2 * | 1/2020 | Narasimhan ............ H04L 63/08 |
| 2012/0209707 A1 | 8/2012 | Ramer |
| 2013/0144723 A1 | 6/2013 | Green |

(Continued)

FOREIGN PATENT DOCUMENTS

WO 2022182674 9/2022

OTHER PUBLICATIONS

Bitcoin Glossary, emerging-tech_glossary-crypto, 2018 Annual National Seminar (Year: 2018), 2 pages.

(Continued)

*Primary Examiner* — Saba Dagnew
(74) *Attorney, Agent, or Firm* — Sheppard Mullin Richter & Hampton LLP

(57) ABSTRACT

A computer-implemented method for presenting advertisements based on user data is disclosed. The method may comprise extracting a mobile phone number associated with an internet user; generating an anonymous and unique identifier for the user based on the mobile phone number, wherein the identifier complies with a privacy rule; analyzing the user's behavior and/or interests to assign behavioral attributes to the identifier; receiving an input to select an advertiser based on a category of the advertisement; transmitting the identifier to the advertiser to generate an advertisement for the user based on the identifier; and receiving the advertisement from the advertiser and presenting the advertisement to the user.

20 Claims, 11 Drawing Sheets

(56) References Cited

U.S. PATENT DOCUMENTS

| | | | |
|---|---|---|---|
| 2013/0291123 A1* | 10/2013 | Rajkumar | H04L 63/20 726/28 |
| 2015/0154646 A1 | 6/2015 | Mishra | |
| 2018/0165688 A1 | 6/2018 | Ismail | |
| 2018/0225442 A1* | 8/2018 | Ranadive | G06F 21/34 |
| 2018/0295514 A1* | 10/2018 | Brown | H04W 12/069 |
| 2019/0005595 A1 | 1/2019 | Tautenhan | |
| 2019/0205932 A1* | 7/2019 | Ericson | G06Q 20/0658 |
| 2019/0236606 A1* | 8/2019 | Padmanabhan | H04L 9/3239 |
| 2019/0279204 A1 | 9/2019 | Norton | |
| 2019/0294817 A1 | 9/2019 | Hennebert | |
| 2019/0332807 A1 | 10/2019 | Lafever | |
| 2020/0005284 A1 | 1/2020 | Vijayan | |
| 2020/0051043 A1 | 2/2020 | Wilson | |
| 2020/0311299 A1 | 10/2020 | Amar | |
| 2020/0349249 A1* | 11/2020 | Weston | G06V 40/171 |
| 2021/0243027 A1 | 8/2021 | Gupta | |
| 2022/0101316 A1 | 3/2022 | Cramer | |
| 2022/0188925 A1 | 6/2022 | Blaikie, III | |
| 2022/0245744 A1* | 8/2022 | Alagappan | H04L 63/0407 |
| 2022/0271915 A1 | 8/2022 | Turner | |
| 2022/0391895 A1 | 12/2022 | Weber | |
| 2023/0038714 A1 | 2/2023 | Padmanabhan | |
| 2023/0040773 A1 | 2/2023 | Dalton | |
| 2023/0068229 A1 | 3/2023 | Blania | |

OTHER PUBLICATIONS

Ravikiran, A. S., "Merkle Tree in Blockchain: What is it, How does it work and Benefits", Jan. 17, 2023 (Year: 2023), 10 pages.

Sharma, Rakesh, "Non-Fungible Token (NFT): What It Means and How It Works", Investopedia > Cryptocurrency, Updated Jan. 28, 2023 (Year: 2023), 11 pages.

Youtube, <URL: https://www.youtube.com/watch?v=PraPZFMj6h8&t=8s>, (Year: 2023), 11 pages.

* cited by examiner

SMART CONTRACT SYSTEM AND METHOD FOR MANAGING DIGITAL USER ENGAGEMENT

PRIORITY

This application is a National Phase application under 35 U.S.C. § 371 of PCT Application No. PCT/US2022/031600, filed May 31, 2022, which application claims under 35 U.S.C. § 119(e) the benefit of U.S. Provisional Patent Application 63/194,504, filed on May 28, 2021, and U.S. Provisional Patent Application 63/269,340, filed Mar. 14, 2022, all of which are hereby incorporated by reference as if fully set forth herein.

BACKGROUND

There are many disparate pieces of the internet, metaverse, virtual reality, augmented reality, and data collection in the world that powers our interconnected digital (online), metaverse, and real-world (online) actions that need to be tracked and need to connect for the internet, digital world, smart spaces, metaverses, virtual reality, multi-verse, augmented reality, event venue, content, and so on to efficiently manage or collect data and make it useful. Currently, there is no efficient, standardized, managed collection or normalization of information across the digital world for identity, and privacy consent.

The current engagement of users on the internet is left to the individual integrity of companies hosting their own solutions on placements like websites or virtual experiences in platforms where placing cookies, looking P addresses, Mobile Ad ID (Maids), Identifier for Advertisers (IDFA), Globally Unique Identifier (GUID), Universal Identifier (UID) 1.0 and 2.0, and other trackers in users devices, computers, video games, televisions, and so on is common practice. For example when users visit each website, they have to set up their individual privacy selections with just the website, either opting in or opting out of tracking, cookies, data resell, measurement, storage, and so on Many times the selections are not easily accessible, or even clear to the user in order to make informed selections. Even if a user can make a selection, the denial of access to a user's rights may prevent the website from working properly or allowing the user to proceed. The host of the website also has difficultly in complying with the numerous privacy policies that are required worldwide. Conventional systems for retrieving consumer consent, such as pop-ups, may violate some of these rules.

Another example of the disparate management of in the real world through digital interfaces, metaverse, and online via internet engagement, of privacy preferences, machine (bot) or person measurement, analytics, or identity tracking is with digital advertisement placement. Conventional audience data sets may be old, misleading, or based on meaningless associations. As systems move toward automated systems for identifying users and/or associating select advertisement opportunities with users and/or consent for opt-in and/or delete data requests, the intelligence engine can only be as good as the data it is built on. However, audience data sets since 2020 have rapidly deteriorated. Current data sets are based on old data aggregators like "cookies" that make improper associations based on outdated modelling. Advertisement platforms also lack transparency, and data accuracy, as most control both the buyer and seller auction through their own proprietary auction place. Systems and methods for providing relevant, continuous data at scale, with open pricing and verified identity is currently not available. Such systems could be used to lower cost per mille impressions (CPMs). Improving accessible data on users would also increase return on investments (ROIs) for advertising costs and increase Return on Ad Spend (ROAS).

Commercial enterprises rely on marketing campaigns and analytics to attract consumers to their products, build consumer rapport, and obtain, and learn from consumer information for future business decisions. Traditional marketing campaigns typically include advertisements, promotions, and coupons directed to a wide audience in hopes that many members of the audience will use the promotions. However, many marketing campaigns are unsuccessful as potential consumers view the promotions merely as unwanted nuisances. In addition, potential consumers receiving offers often naturally distrust the source of the promotional offers. Gaining this trust is a difficult hurdle for marketers. Knowing that the customer is still in market or finds the info relevant is even more difficult.

SUMMARY

Exemplary embodiments described herein includes a smart contract system and method for managing digital user engagement that may include user activities on the internet, virtual reality environments, augmented reality environments, streaming services, television, smart devices, programmatic advertising, digital out of home cookie-less solution with identity verification and privacy layer via non-fungible tokens (NFT) and/or smart contracts using combinations of public and private ledgers.

Exemplary embodiments described herein may permit a central source for consent preferences for advertising that may allow verification of tracking approved and consented user preferences across multiple applications and devices, including various smart devices to handle the personal data of the user.

Exemplary embodiments described herein may use an open, private, centralized and/or non-centralized, or decentralize ledger infrastructure for managing user interests, engagement, consent, taste preference, location over the internet, and combinations thereof. Although an entire exemplary system is described herein, no one part of the system is necessary, all sub-components are modular, and identification can be connected to other third party data, or other third party identifiers. Individual pieces of the system may be used in isolation or in combination with other parts of the system. For example, embodiments of the advertisement exchange may be used in any advertisement exchange application for example identity, preferences, and is not limited to the overall system requirements or restricted to internet user, gamers, are described herein.

Exemplary embodiments described herein may use an open ledger, closed ledger, or a combination of an open ledger and closed ledger infrastructure for managing user engagement over the internet and in the world. Exemplary embodiments of the systems and methods described herein may include any combination of modules for achieving different functions described herein. Exemplary modules may include any combination of: user identification, privacy policy, user log, attribution, dynamic audience creation, taste preference, data analytics, ad exchange, user payment, directories, user accounts, or digital wallet or other preferences such as data collection, content preferences, and rewards.

Exemplary embodiments of the present disclosure may be directed to a method and a system for promotional advertisements, identifying interests, analytics, by leveraging first party, second party, or third party, data not limited to behavioral targeting, interests, or inbound traffic, based on user data. The disclosed techniques may provide for gathering, recording, interloping, and/or unification of privacy preference, policy and verification of the user, through developing a hierarchical order for the collection of data, such as data like behavioral attributes of the user as the user views content over the internet or observing digital advertisements, while protecting user privacy and providing compliance with privacy provisions.

Exemplary embodiments of the systems and methods described herein may comprise using a phone number with world code, area code, number, extension, or a combination thereof to associate information of the user, such as their behavioral information, privacy selections, and/or personal characteristics (such as, for example, gender, age, etc.) in order to provide targeted advertising while minimizing the potential disclosure of personal information restricted from use by one or more privacy laws, consumer protection laws, or restrictions imposed by a jurisdiction.

Exemplary embodiments described herein may include systems and methods for providing compensation to a user for the use of their data that has not been done before for measurement and identity verification, advertisement relevance, taste preference, and so on. Paying a user for the use of their data for advertising, measurement, identity verification, interests preferences, artificial intelligence or machine learning, and other ways may incentivize users to share their information. Information may be passively collectively while providing a more robust and accurate data set to potential advertisers to provide better targeted advertising to the user.

A computer-implemented method for presenting advertisements based on user data is disclosed. The method may comprise extracting a mobile phone or other identifier associated with an internet user; generating an anonymous and unique identifier for the user based on the mobile phone number, wherein the identifier complies with one or more privacy rule(s); analyzing the user's behavior, interest and/or other data point to assign behavioral attributes to the personal identifier; receiving an input to select an advertiser based on a category of the advertisement; transmitting the identifier to the advertiser to generate an advertisement for the user based on the identifier; and receiving the advertisement from the advertiser and presenting the advertisement to the user.

In various example embodiments, the attributes may include any combination of the user's gender, age, or net worth of the user plus interests and behaviors. The privacy rule may include General Data Protection Regulation (GDPR) and/or California Consumer Privacy Act (CCPA), or others that are likely to be implemented in the future. The category of the advertiser may be based on any combination of, but not limited to, alcohol, insurance, fast food, footwear, mobile technology, automotive, or video games, political, or other sector trying spread awareness of brand or campaign The analyzing of the user's behavior, content consumed, context of content consumed (listening to podcast driving) and/or interests may comprise utilizing a method for data capture, not limited to just a a vpn, or crawler, or pixel or strategy allowing pass-back of information from ad exchanges, users daily routine, users daily life experiences, social media, as an application and data capture strategy used to track the user across multiple websites and locations both online, offline (through digital interfaces), and multiverse. The input to select the exact audience may be from an advertiser and executed by a media buyer. The advertisement can be generated dynamically and inserted anywhere the content is properly sized for a container based ad slot, or audio, or other or selected based on the behavioral, interest, location attributes. A format of the advertisement can be one or more of video, audio, images, or text. The format of the advertisement can be based on the preferences of the user. The format of the advertisement can be based on a display medium being employed or exposed to by the user.

A system for monetizing advertisements is disclosed. The system may comprise one or more processors and one or more associated memory, the one or more associated memory having stored thereon non-transitory computer readable instructions that when executed by the processor are configured to: extract a mobile phone number associated with an internet user; generate an anonymous and unique identifier for the user based on the mobile phone number, wherein the identifier complies with a privacy rule; analyze the user's behavior and/or interests to assign attributes, interests, preferences, consent to the identifier; receive an input to select an advertiser based on a category of the advertisement; transmit the identifier to the advertiser to generate an advertisement for the user based on the identifier; and receive the advertisement from the advertiser and present the advertisement to the user in real world, online, metaverse.

BRIEF DESCRIPTION OF DRAWINGS

Exemplary embodiments of the disclosure described herein may be used to tailor advertisements based on the age, behavioral attributes and/or interests of each consumer. Other objects and advantages of the present disclosure will become apparent to those skilled in the art upon reading the following detailed description of exemplary embodiments, in conjunction with the accompanying drawings, in which like reference numerals have been used to designate like elements.

DESCRIPTION

Figure 1:
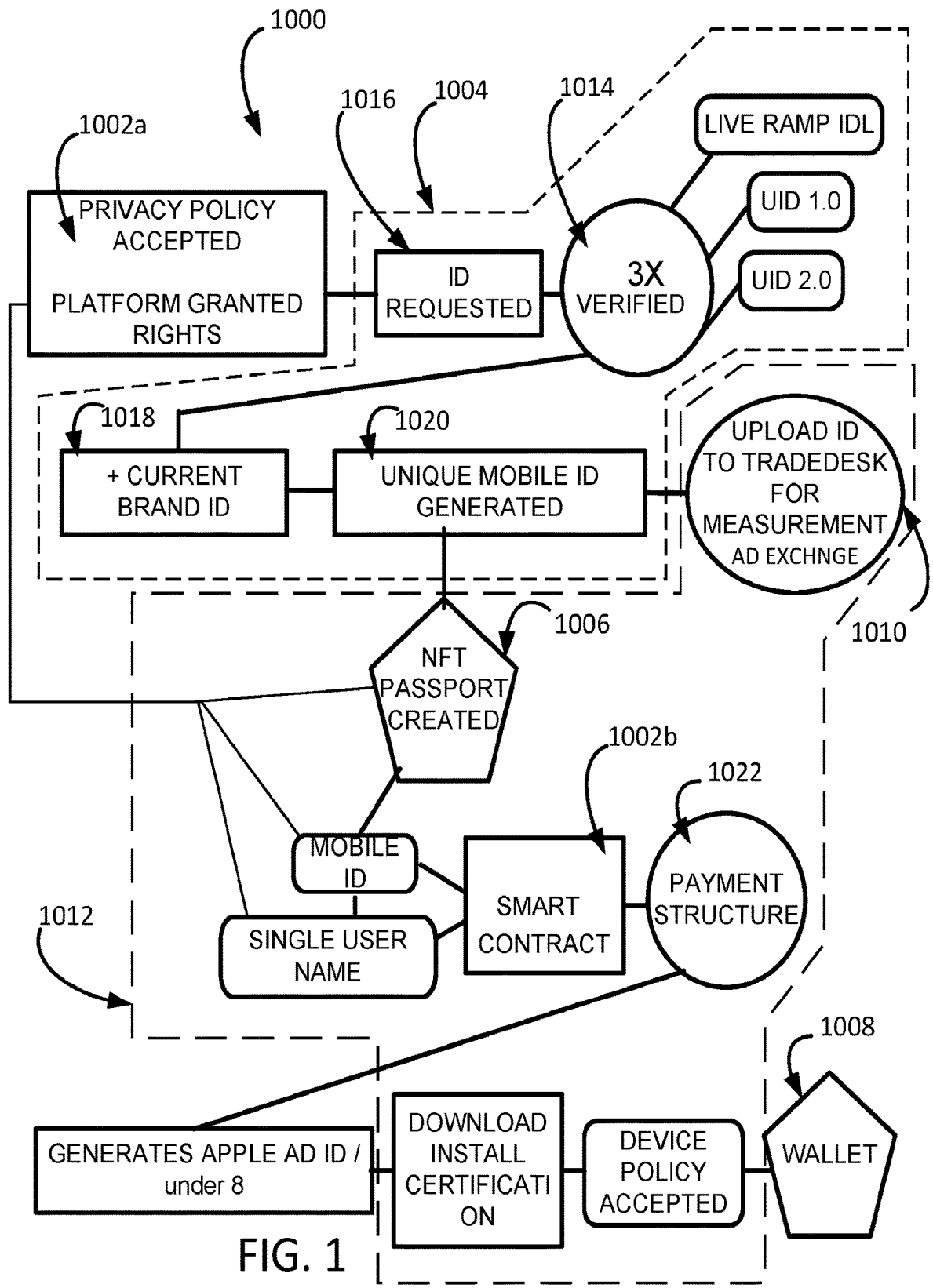
FIG. 1 is a block diagram illustrating an exemplary system according to an exemplary embodiment of the present disclosure.

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

Exemplary embodiments described herein may use an open ledger infrastructure for managing user engagement over the internet. Although an entire exemplary system is described herein, no one part of the system is necessary. Individual pieces of the system may be used in isolation or in combination with other parts of the system. For example, embodiments of the advertisement exchange may be used in any advertisement exchange application and is not limited to the overall system requirements described herein.

Exemplary embodiments described herein may use an open ledger infrastructure for managing user engagement over the internet. Exemplary embodiments of the systems and methods described herein may include any combination of modules for achieving different functions described herein. Exemplary modules may include, any combination of: user identification, privacy policy, user log, data analytics, ad exchange, user payment, consent, record of visits, and mobile wallet. Exemplary embodiments may include a visual user interface that may be managed through a user application stored on a user electronic device. The user application may provide a visual representation of a user log where users essentially stamp or provide an entry as they go around places and are engaged by entities and brands. Exemplary embodiments of the user log and/or the system described herein may include smart contracts assigning or defining how the user wants the internet and data collection to track them and family members.

Exemplary embodiments of the present disclosure may be directed to a method and a system for promotional advertisements by behavioral targeting based on user data. The disclosed techniques may provide for gathering, recording, and developing behavioral attributes of users viewing content over the internet while protecting user privacy and providing compliance with legal or policy mandated privacy provisions.

Exemplary embodiments of the systems and methods described herein may comprise using a phone number to associate information of the user, such as their behavioral information, personal characteristics (such as, for example, gender, age, etc.) in order to provide targeted advertising while minimizing the potential disclosure of personal information restricted from use by one or more privacy laws, consumer protection laws, or restrictions imposed by a jurisdiction.

Exemplary embodiments described herein may include systems and methods for providing compensation to a user for the use of their data. Paying a user for the use of their data may incentivize users to share their information, while providing a more robust and accurate data set to potential advertisers to provide better targeted advertising to the user.

A system and method for monetizing advertisements is disclosed. The system may comprise or the method may include using one or more processors and one or more associated memory, the one or more associated memory having stored thereon non-transitory computer readable instructions that when executed by the processor are configured to: extract a mobile phone number associated with an internet user; generate an anonymous and unique identifier for the user based on the mobile phone number, wherein the identifier complies with a privacy rule; analyze the user's behavior and/or interests to assign behavioral attributes to the identifier; receive an input to select an advertiser based on a category of the advertisement; transmit the identifier to the advertiser to generate an advertisement for the user based on the identifier; and receive the advertisement from the advertiser and present the advertisement to the user.

Figure 5:
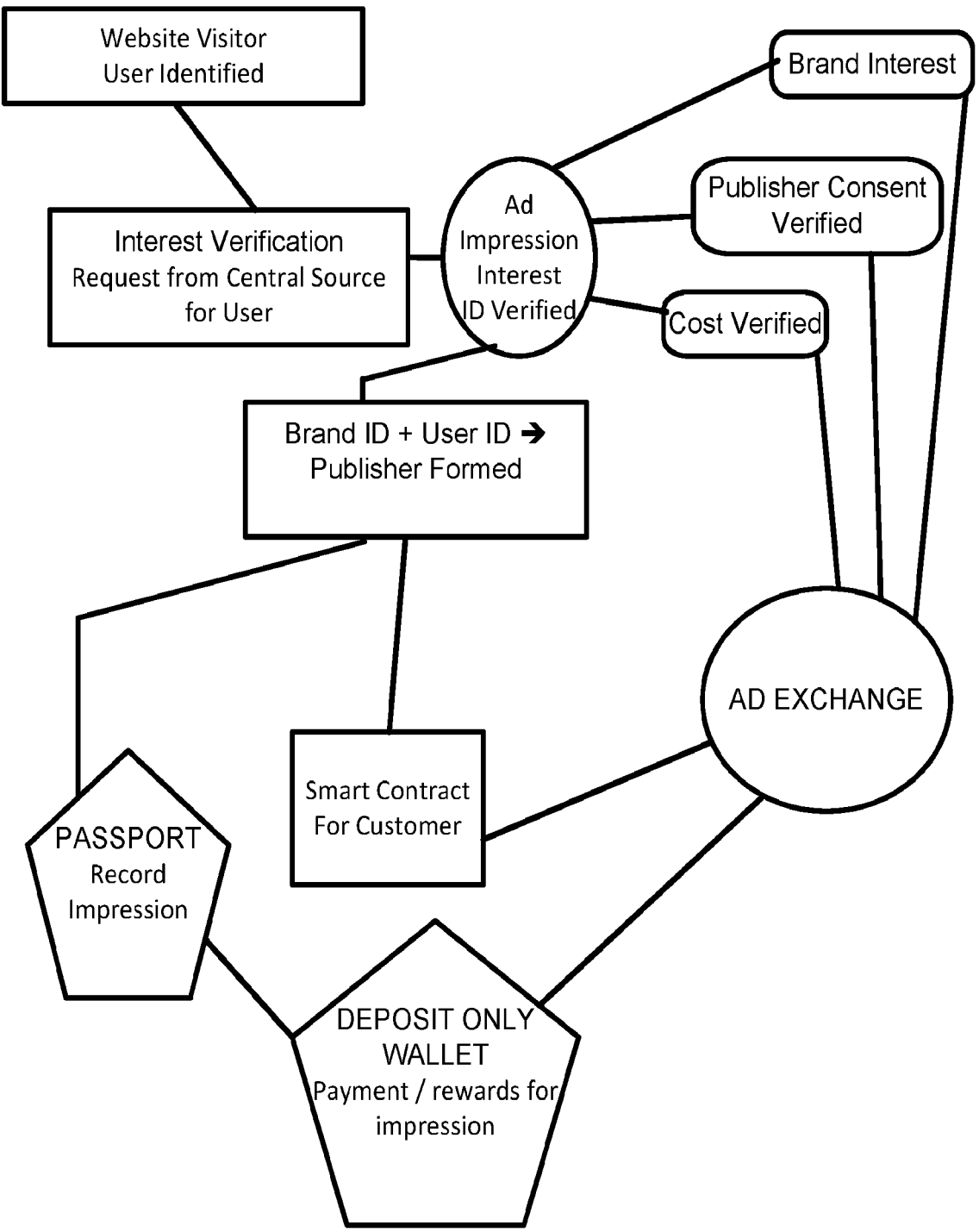
FIG. 5 is a block diagram illustrating an exemplary system according to an exemplary embodiment of the present disclosure.

FIGS. 1 and 5 illustrate exemplary system flowcharts for exemplary modules for managing user engagement over a network according to exemplary embodiments described herein. The exemplary system 1000 may include any combination of modules such as the user identification, privacy policy management, user log, data analytics, ad exchange, user payment and mobile wallet described herein. Exemplary methods associated with the modules may occur in different order as illustrated by a comparison between FIGS. 1 and 5, or may include different combinations of functions using the different modules.

The exemplary system 1000 may include any combination of modules such as the user identification 1004, privacy policy management 1002a, 1002b, user log 1006, data analytics 1012, ad exchange 1010, user payment and mobile wallet 1008 described herein. The modules may occur in single modules or may be separated. For example, as illustrated in FIG. 1, the privacy policy management may comprise privacy policy acceptance 1002a, and generation of smart contract 1002b. Data analytics 1012 may be distributed over a plurality of modules and/or may be integrated into different modules, such as, for example, the payment structure, ad exchange, user payment, user identification, etc.

As shown and described herein, an exemplary system and method for managing user engagement on a network may include systems and methods for user identification. The systems and methods according to exemplary embodiments of the present disclosure may include receiving information about a user. The information about the user may be received in a number of ways. For example, the user may sign up for services that permit the user to identify themselves, and send information to the system so that the system may receive information about the user. In an exemplary embodiment, the system may identify a user. The system may be configured to identify a user, such as through identifiable information entered into a website or through a user interface of a network. For example, the user may enter a user name, password, email address, name, phone number, or any combination of identifiers. The system may also use information about the user's systems, such as device and/or network identifiers, cookies, etc. In an exemplary embodiment, the system may receive a phone number of the user. The phone number may be provided by the user, or may be obtained using other information of the user (either directly or indirectly) to look up the phone number. In an exemplary embodiment, once a phone number is received for the user, the system may generate a unique identifier for the user. The unique identifier for the user may be generated from the user's phone number. The unique identifier may thereafter be used to identify the user. For example, the unique identifier may be used for any combination of determining the privacy settings for the user, obtaining user generated data or information for providing an advertisement to the user, tracking payments to or for the user, or making payments to or for the user As shown and described herein, an exemplary system and method for managing user engagement on a network may include systems and methods for privacy policy management. Exemplary systems and methods described herein may permit a user to identify their user preferences regarding privacy and use of the user's information, such as for targeted advertising, solicitations, or other user engagement by the brand or entity. In an exemplary embodiment, the system may be configured and the method may include a user interface to permitting the user to identify their user preferences regarding privacy and use of the users information. The system may be configured to store the user preferences. In an exemplary embodiment, the system may use an open ledger to store user preferences. In an exemplary embodiment, the system may use block chain to store user preferences. As shown and described, a smart contract 1002b may be generated based on the user preferences. In an exemplary embodiment, the user preferences may be associated with a user and associated with a brand, such that a unique combination of brand to user generates a smart contract for controlling the privacy settings of the user as it relates to information from the brand. A single user may therefore have a plurality of smart contracts or open ledger entries associated with the user as the user is related to different brands and sets different user preferences with those individual brands.

As shown and described herein, an exemplary system and method for managing user engagement on a network may include systems and methods for tracking user engagement, such as through the user log described herein. In an exemplary embodiment, as the user is engaged by a brand or entity, such as according to the user's preference related to consumer engagement by the brand. In an exemplary embodiment, the system and methods for tracking user engagement may comprise a user log as described herein. The user log 1006 may be associated with the user, such as through the unique identifier as described herein. The user log may be associated with the privacy policy and/or smart contracts and/or open ledger for tracking user preferences. In an exemplary embodiment, the user log may provide a user interface to associating the user with one or more brands or entities in which the user has pending permissions or relationships for being engaged (or not engaged) by one or more brands or entities. The user log may also be used to track the engagements by the one or more brands or entities as they occur with the user. In an exemplary embodiment, the engagements may be tracked so that a user may be paid for the engagement by the brand and/or entity for which their user data may be used to target advertisements. In an exemplary embodiment, the user log may comprise a database for storing user information, brand/entity information, smart contracts, privacy preferences, engagements by the brands/entities with the user, payments made to the user based on the engagements, or a combination thereof. In an exemplary embodiment, the user log may be accessible by the brand and/or user and/or system in order to identify and/or track engagement with the user, make payments to the user, obtain user data according to embodiments described herein, or any combination thereof.

As shown and described herein, an exemplary system and method for managing user engagement on a network may include systems and methods for an ad exchange for pricing advertisement opportunities and providing advertisements to the user. In an exemplary embodiment, the system may communicate with and/or include an advertisement exchange. The advertisement exchange may comprise a plurality of advertisements associated with the one or more brands and/or entities. The plurality of advertisements may comprise different advertisements for the same product corresponding to different user attributes so that advertisements may be tailored to individual users. The plurality of advertisements may comprise different advertisements for different products in which the products and/or advertisements are classified based on user information. The advertisement may be associated with advertisement information. For example, the advertisement information may comprise any combination of: the brand, the product, the entity associated with the brand, the price of the product, the type of product, brand category, etc. User information may be demographic information, such as age, gender, race, sexual orientation, residential location, level of school, etc. User information may comprise predilection information such as political affiliations, interests, activities, etc. Exemplary embodiments of the advertisement exchange may track and/or receive information about costs or payments made to secure an advertising opportunity to a user. In other words, the advertisement exchange may retain information on the cost an advertiser pays in order to serve and advertisement to a user. The advertisement exchange may track and/or receive other information associated with the advertisement costs, such as the location the advertisement was served, the user information, the advertisement information, etc. Exemplary embodiments of the advertisement exchange may be used to generate advertising quotes for serving advertisements based on a number of criteria, such as target customer, target location, brand category, other customer information, other brand, advertisement information, etc.

As shown and described herein, an exemplary system and method for managing user engagement on a network may include systems and methods for making payments to the user for using their user data and/or for serving targeted advertisement(s) to the user. In an exemplary embodiment, the system described herein may include a payment portal for the brand and/or entity to make payments to the user for use of their data, such as when an advertisement is served to the user. Exemplary embodiments may include payment by the brand/entity to the user for any combination of engagements with the user as described herein.

As shown and described herein, an exemplary system and method for managing user engagement on a network may include systems and methods for analyzing user data and/or advertisement data for determining pricing of advertisements in real time. Exemplary modules and methods described herein may receive and use various combinations of information. Exemplary systems and methods described herein may analyze the information in order to provide analytics, customization, targeting, estimations, pricing, etc. according to embodiments described herein. The analysis may be performed in stand alone modules and may be used individual and/or may be integrated into and/or used with other modules as described herein. Exemplary embodiments described herein may analyze information in order to provide advertising pricing based on any combination of the location the advertisement is served, the category of advertisement, user information, advertisement information, brand, entity, probability of obtaining the advertisement opportunity, etc. Exemplary embodiments described herein may analyze information in order to target advertisements for a specific user based on user data.

Currently brands and entities wishing to engage a consumer individually mange privacy policies of the user whenever the user encounters the entity, such as when the user visits a website. The entity may use cookies and/or pop ups to obtaining user consents and maintaining or tracking those consents. However, the pop up itself or any tracking that may occur before the consumer consents may violate privacy policies. Exemplary embodiments of the privacy policies using open ledgers may therefore be used to provide a central repository of data policies that an entity can verify before any violation can occur.

Even if the user provides consent for their data to be managed by the entity, the user will not want their information or their activities on the internet to be available through a public ledger. Currently entities track the information of the user and permits advertisements to be served to the user. The user does not see any benefit to the use of their data. The use of the user's data is held by the entity, without visibility to its use or accountability with the user's privacy policy. Exemplary embodiments of the user log can be used to bridge the private information held by the user and the public use of that information retained by the entity. The user log can therefore bridge the private holding of data at the entity and at the consumer without publicly sharing the information on the open ledger.

Exemplary embodiments described herein may use a combination of an open ledger(s) and private ledger(s) to track and share information between a user and a brand or entity engaging with the user. In an exemplary embodiment, user data such as activities on a network may be tracked on a private ledger. This may include any conventional storage methods, such as databases. In an exemplary embodiment, such user data including activities on a network may be stored by the brand and/or entity in which the user has provided authorization to track, receive, and/or use their user data through selections made by the user preferences. Exemplary embodiments may use public ledgers for tracking and/or sharing information. For example, the user preferences, such as privacy policy statements with one or more brands/entities may be stored on an open ledger. The user and/or brand may be looked up to ensure that the user has permitted advertisements from the brand/entity before being served the advertisement. Another private ledger may be used to track and/or share the engagements by the user with one or more brands/entities so that the user is aware of engagements/encounters and/or the payments that should be paid to the user based on those engagements/encounters. In an exemplary embodiment, the system may have write capabilities to the user's private ledger to add entries of encounters with the brand/entity when encountered by the user. In an exemplary embodiment, the user log may comprise the private ledger of the user. In this case, only the user may read or have access to the data stored within the ledger so that the user's network activity is not available to the public or to others.

Exemplary embodiments described herein allow a user to create an account and set up their user identification as well as other attributes of the system described herein, such as, for example their privacy policy, user log, wallet and combinations thereof.

Figure 2:
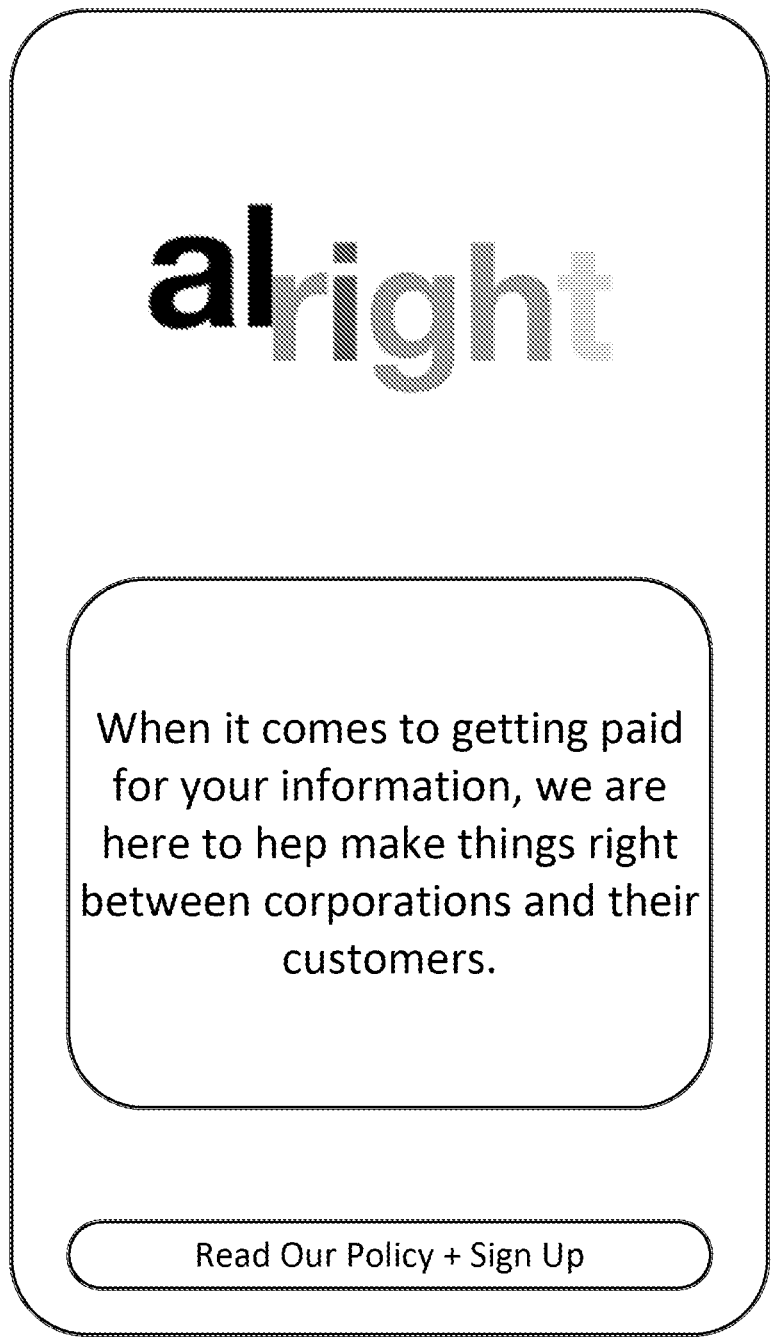
FIGS. 2-4 illustrate exemplary user interfaces of an exemplary user experience of the system according to exemplary embodiments of the present disclosure.

FIG. 2 illustrates an exemplary user interface that may be generated by the user identification module for permitting a user access to create an account. The user interface may be generated through an application downloaded to an electronic device or presented to a user through a website or other electronic interface that the user navigates to. The user interface may be configured to display to the user the option to access and view the associated terms of the system, including, for example, the privacy policy associated with use of the platform. The user interface may be configured to permit the user to select to sign up for the platform.

The user interface may be configured to accept a user input through the user interface. User inputs may include, but are not limited to radio buttons, push buttons, drop down menu items for selection, text boxes for data entry, among others. As illustrated on FIG. 2, the user may select a button to indicate acceptance of the terms of the service or platform and navigate to additional screens of the user interface.

In an exemplary embodiment, the system may receive information about the user. The system may receive information in various forms. For example, the system may, through the user interface, request specific information from the user, such as, for example, the username, address, phone number, email, etc. The system may also receive authentication information, such as biometrics, username, password, device information, etc. The system may receive information in other manners such as extracting information from the user's device, network user history, application user history, device use history, cookies, etc.

In an exemplary embodiment, the system may be configured to request, generate, transmit, or otherwise associate a unique identifier to the user. In an exemplary embodiment, the unique identifier may be the user's phone number. In an exemplary embodiment, the unique identifier may be based on the user's phone number. For example, the unique identifier may be created from the user's phone number through one or more hashing, truncating, or other algorithm to generate a unique identifier from the user's phone number. Exemplary embodiments described herein may include other ways to generate a unique identifier, such as, for example, user's email, a combination of personal information such as name and/or birthday, device identifiers, location information, address, random number generation, and combinations thereof. The unique identifier may use any combinations of alphabetic letters, numbers, symbols, characters of other languages, etc.

Exemplary embodiments described herein may use one or more forms of authentication to verify the identity of the user. For example, as illustrated in FIG. 1, three factor authentication 1014 may be used. The system may pull public data on the user to cross reference with data entered by the user. The user may be verified in other ways, such as passwords, biometrics, device authentication, third party authenticators, unified identification (such as hashing from user data like email), etc. Other verification methods may include sending confirmation emails, texts, calls, or other exchanges to confirm that entered information is actually associated with the user.

As illustrated in FIG. 1, the user may engage the system, and accept the system's user policies 1002a. By engaging the system, the user is requested a unique identifier 1016. The user is verified 1014 and given a unique identifier, such as one based on the user's phone number.

Additional exemplary embodiments of user identification is shown and described later in the instant disclosure.

Exemplary embodiments of the system described herein permit a user to create and/or save a personalized privacy policy. The personalized privacy policy may be generated by permitting the user to select a combination of features about how their data can be stored and/or used. For example, the user may select whether cookies may be saved on their device, whether their activity can be tracked, whether personalized advertisements can be served, etc. The system may be configured to create a statement incorporating the selections of the user. The statement may be created in other ways, such as through a user interface comprising feature selections, text boxes, questions and answers, etc.

Exemplary embodiments of the system described herein may use an open ledger system for storing and/or providing access to the privacy statements of users. For example, a user may create a privacy policy statements using the embodiments described herein. An entry associated with the user can be entered on an open or closed ledger having metadata that includes the details of the privacy policy statement. Companies, Ad exchanges, publishers, and/or platforms, wishing to engage with the user may thereafter look up the user's privacy statement through the open ledger.

Exemplary embodiments of the system described herein may nest or relate statements together such that a nested or related open ledger can be created. The relationship between policies may permit individuals and/or devices in relation to a user to be stored separately, while being managed in a hierarchical manner. For example, a parent to a minor child may set their own privacy statement as well as set a privacy statement for the child. The child can thereafter make their own privacy statement. However, the child's privacy statement is positioned under or nested within the parental privacy statement. Therefore, to the extent that a privacy statement conflicts, the parental privacy statement supersedes the permissions provided by the child.

After a privacy statement is created, embodiments of the privacy statement may reside in different forms and/or locations. As described herein, the privacy statement may reside on and be accessible through an open ledger. Details of the privacy statement may also or alternatively reside in the user's browser, certificates, cookies, etc. The privacy permissions may therefore quickly and efficiently be communicated to entities in order to permit their compliance with the user's desired policies.

As illustrated in FIG. 1, the system may permit a user to make privacy selection and generate the smart contract 1002b according to exemplary embodiments described herein. The smart contract may be associated with the unique user identifier and/or unique mobile identifier to identify the user without using user personal information.

In an exemplary embodiment, as illustrated in FIG. 1, the user may specify or be provided with a payment structure 1022 in accordance with the user preferences including selections of use of the user's data. For example, payment structures may include the amount paid per encounter, the amount paid per type of encounter, the amount paid for the level of tracking or user data the user has permitted based on their privacy selections, the timing of payment, the type of benefit (such as coupons, monetary deposits, discounts, points, etc.), etc.

Exemplary embodiments of privacy policy is shown and described in co-pending application U.S. 63/268,122, filed Feb. 16, 2022, titled "Smart Contract System and Method for Managing User Privacy Policies," which is incorporated by reference in its entirety herein. Exemplary embodiments of nested contracts that may be used with embodiments of the user identification and/or privacy policy described herein is shown and described in co-pending application U.S. 63/308,846, filed Feb. 10, 2022, titled "Systems and Methods for Hierarchical Organization of Data Within A Non-fungible Token or Chain Based Decentralized Systems," which is incorporated by reference in its entirety herein.

In an exemplary embodiment, an entity, such as a brand or company supporting a website or trying to advertise to a user can institute the communication with the user. For example, a company may ask a customer to sign up with the brand. In an exemplary embodiment, regardless of whether an entity initiates the communication with the user, the user and/or privacy policy for the user may be associated with a specific brand. The user may therefore create separate policy statements in association with one or more different brands. The different brands may be distinguished with unique brand identifiers. Accordingly, each policy statement may be associated with a user through a unique user identification alone or in combination with a unique brand identification. In an exemplary embodiment a single unique identifier may be created to associate the individual brand and the individual user combination. The ID for the individual and the Brand ID may therefore be combined or used to generate a unique mobile ID (also referred herein as a publisher ID) that associates a single, unique individual, with a single, unique content source where a brand displayed an advertisement.

As illustrated in FIG. 1, the user may identify a specific brand in which the user may provide permissions. The brand may have associated therewith a unique brand identifier, 1018, which is combined with the unique user identifier, from 1016, to generate a unique mobile identifier, 1020. The unique mobile identifier may be used to identify the user and the brand and associate a smart contract 1002b comprising the user preferences for the given brand. The system may permit a user to make privacy selection and generate the smart contract 1002b according to exemplary embodiments described herein. The smart contract may be associated with the unique mobile identifier to identify the user without using user personal information.

Exemplary embodiments of the system and methods describe herein may use a user log layer displayed in a graphical interface, in order to bridge information from the consumer (user) and the entity desiring to engage the consumer (otherwise referred to herein as publisher, brand, entity, product, or company).

In an exemplary embodiment, a user log of a user may be coupled to the user's browser, the user's devices, or a combination thereof. The user log may therefore be written to when a brand engages a user to record the engagement. The engagement may be when a user visits a website, get served an advertisement through a banner ad or smart billboard, sees or hears an advertisement, sees or hears a product placement such as in a video or audio clip, product dynamically placed in visual content including VR and AR and such as when listening to a podcast or watching a video an ad specific to that user preference. The engagement may also be when the user is converted to a customer, such as when the user redeems a coupon, makes a purchase of a product from the brand, makes a selection associated with the brand, buys a ticket, etc.

Exemplary embodiments of the user log may comprise a database that can be used to record impressions served to a user and a payment deposited for the rights to reach that user. The user log may therefore store the publisher identifier (the combination of the brand and the user), the brand identifier, the user identifier, or a combination thereof as record of visit and payment. The users can redeem, claim the money, token, coin, as a grant of consent The user log may also store a value for exchange with the user. This may be a value for the cost of serving an impression to the user through an advertisement exchange, the value to the brand of having that individual customer see a product placement, the value the of a product placement to a user within that geographic area or similar demographic statistics to that user, an identifier to quantify the quantity or quality of the engagement, or a combination thereof. The value may also be received from the exchange.

In an exemplary embodiment, the user log that records the brand and the user, or the combination of the brand and the user, with the value can be maintained on an open, closed, semi-private or consent based ledger. The open ledger can therefore be used to confirm transactions between the user and the brand, and create a confident recording that brands are complying with the respective privacy policies with the user.

Exemplary embodiments may permit a user to reject an entry into the user log and/or return or reject payment from the engagement. The user may therefore have control of their data and remove entries the user does not want kept. In an exemplary embodiment, the user interface, as described herein in more detail, may provide notification to the user of a potential payment and/or entry into their user log. The system may permit the user to confirm or reject the payment and/or entry. If accepted, the entry may be written to the user log. The user log may be, at least partially, and open ledger using decentralized block chain.

In an exemplary embodiment, the user log may be used to confirm relevancy of data and/or engagement with a user. Exemplary embodiments of the user log may comprise an engagement with a user that is monetized by recording the amount spent on the opportunity by a brand and/or the amount paid by the brand to the user for the opportunity, and the publisher had received proper consent to serve that advertisement.

Figures 3, 4:
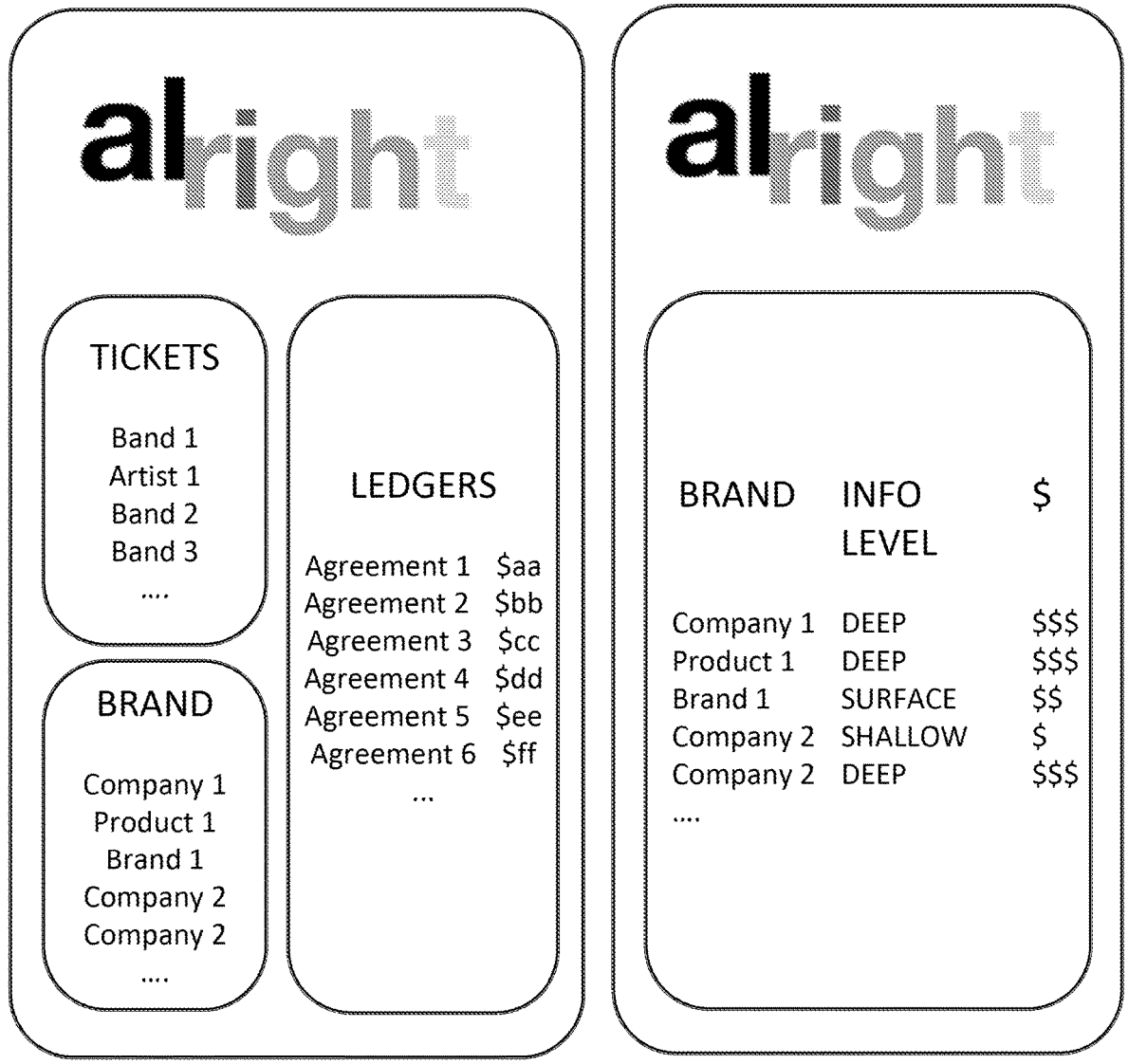

FIGS. 2-4 are exemplary user interfaces associated with a user log according to embodiments described herein. The user interface may include any number of sections as described herein. The sections may be arranged on a single interface or may be through multiple different interfaces, such as different pages that a user can obtain by making selections through the user interface. Any combination of the sections, features, or functions described herein can be provided on the user interface.

In an exemplary embodiment, the system may comprise the user interface for tracking a user's information and transactions with the different brands, such as a visualization of the user log. Accordingly, the user interface may comprise a section that identifies the brands in which the user has transactions. These may include where a user visited a website, watched an advertisement, saw the product in a product placement such as through a video or audio clip, etc. The user may select a given brand and see the lists and associated reward (benefits) received for having encountered that brand.

In an exemplary embodiment, the user interface may include a section that tracks the one or more policy statements (smart contracts or non-fungible tokens (NFTs)) that are created between the user and one or more different brands.

In an exemplary embodiment, the user interface may include a section that tracks actual purchase or engagement of the user with the brand. This may occur when the user redeems a coupon, purchases a product, buys a ticket, etc. The user interface may also include a section (not shown) that may include incentives from the brands to the users. This may include coupons, rewards, discounts, etc. that is served to a user to support the additional conversion of the user to a customer of a given brand.

In an exemplary embodiment, the user interface may include a value. The value may be based on any combination of the user, the amount of tracking or use of the user data the user has granted to the brand (i.e. such as through the privacy statement), the brand, a location of the user, demographic statistics of the user, preferences of the user, or other information available to the system such as through public information or information provided to, from, or through the system. As illustrated in FIG. 4, different brands may be identified with different levels of association with the user that has unique value between the user, the brand, and the level of association. For example, if the user permits more invasive tracking and/or brand placement in front of the user, or shares more information with a brand about their tastes, demographic statistics, location, etc., then that user may be more valuable to the brand than another user that does not provide such information, tracking, or level of engagement.

In an exemplary embodiment, the user log may communicate or be connected to the user's mobile wallet in order to be paid for the engagement between the user and the brand.

In an exemplary embodiment, the wallet may be coupled to the user log through an exchange as described herein.

FIG. 1 illustrates an exemplary association between the user log and a mobile wallet of a user using an Apple device. The system may therefore be configured to use the Apple AD IDs, certificates, Apple policy acceptance, etc. in order to consummate payment from the user log to the wallet. The association may also be through an android device or other connection between the user log and the mobile wallet of the user.

Exemplary embodiments are not limited to direct payments back to the user. Exemplary embodiments may also include other forms of value to the user. For example, the user may be enrolled in a loyalty or points program. The user may obtain points in response to exchanges with the brand. The points may then be redeemed for discounts, purchases, gifts, etc. The user may also be rewarded, such as, in receiving discounts, coupons, or other benefits when the user is engaged by the brand.

Exemplary embodiments of systems and methods described herein may include an exchange. Exemplary embodiments of the exchange may be used in combination with other system components described herein and/or may be used by itself or integrated into other systems.

Exemplary embodiments of the exchange may consolidate information on users, statistics of users, demographics of users, statistics on advertisement opportunities, statistics on user/brand exchanges, or a combination thereof. Exemplary embodiments of the exchange may use the consolidated information in order to set bid prices, value bid opportunities, value users, value user data, or a combination thereof. Exemplary embodiments of the exchange may facilitate payments, such as from a brand to pay for an advertising encounter with a user, such as to a user for the use of the user data; such as to the host of the advertising opportunity such as the website host that included the banner ad or other advertisement opportunity to the brand. Exemplary embodiments of the exchange may also be configured to confirm the validity of a potential engagement such as, for example, by accessing and confirming a privacy statement of a user in the open ledger. Exemplary embodiments of the exchange may include any combination of features described herein as desired for the system.

Exemplary embodiments of the exchange described herein may include access to an online auction interface for real time bidding on advertisement opportunities to serve to users on a network, such as the internet. The advertisement opportunities may also be from other locations, such as advertisements for product placements in videos, advertisement placements on smart or electronic billboards or signs, commercial breaks on radio systems at venues. The exchange may manage the receipt of advertisement opportunities, the bidding on such opportunities, the delivery of advertisements in response to the opportunity and the highest bid, or combinations thereof.

Exemplary embodiments of the exchange may receive information about the advertisement opportunity. This received information may include the user identifier, advertisement opportunity, information about the user, demographics or statistics of the user, or combinations thereof. Because the exchange may also receive additional information about the brands attempting to bid on advertisement opportunities, the exchange may also have access to a brand identification for the brand that actually exchanges with the user. The exchange may also have brand identifiers for brands bidding on opportunities. The exchange may therefore interface and filter the bidding opportunities based on the privacy statements of a user. For example, if a user has not created a privacy statement with a brand, then the brand may not bid on the opportunity to engage that user. The exchange may also filter what information of the user is presented to a brand in order to bid on the opportunity based on the user privacy statement. For example, the exchange may look up a user and determine which brands the user has shared information. The exchange may then provide additional user information to those brands for the bidding, while anonymizing the advertisement opportunity for the remaining brands that the user has not given permission in which to share information.

Exemplary embodiments of the exchange may be configured to confirm whether or not a specific user is identified as having a brand interest. For example, the exchange may receive the user identifier and be able to confirm whether the user has received prior advertisements from a brand, has engaged a brand, has a policy statement accepting engagement by a brand, or combinations thereof.

Exemplary embodiments of the exchange may facilitate payments between interested parties of the platform. For example, the exchange may have access to digital wallets of users, brands, etc. The exchange may have access to direct accounts of brands for payment. In an exemplary embodiment the digital wallet of a user may be a deposit only wallet in which the exchange may be configured to make deposits into through an open ledger.

FIG. 5 illustrates an exemplary flowchart of a process associated with the system and methods described herein.

As illustrated, first a user may visit a website. The user can be identified when navigating to the website. The user can be identified a number of ways, including, for example, any of those described herein. The system may recognize attributes of the user, the user's device, the user's digital communication through the communication interface of the website or over a network. The user may have preregistered and been provided an identifier. The user may have preregistered or set up a browser certificate or other identification system to identify the user. The user may have a storage of one or more cookies to identify the user. The user may have used a personal link or invitation that provides information about the recipient of the link.

Once the system has identified the user, the system may be configured to perform a number of processes, either sequentially, simultaneously, or a combination thereof. For example, the system may perform any combination of determining an interest level of the user, identifying one or more ad impressions for the user, confirm the user have the appropriate policy statements for the use of their data and receipt of brand engagement.

In an exemplary embodiment, the system may be configured to retrieve an interest verification and request an advertisement impression. The requested advertisement impression may provide a brand ID of the company associated with the brand impression. The system may then use the brand ID and the user ID for generating the publisher ID. According to embodiments described herein, the system may be configured to look up the privacy policy (smart contract) of the user under the brand ID, user ID, publisher ID, or a combination thereof. Once the use of user information is confirmed based on the user's privacy policy, the system may communicate with an advertisement exchange. The advertisement exchange may be configured to provide the advertisement associated with the brand ID. The advertisement exchange may use the user ID in order to serve personalized advertisement based on preferences or data obtained about the user. Exemplary embodiments of the advertisement exchange may also be used to verify a cost of an advertisement opportunity, confirm publisher consent to bidding on the opportunity, confirm user consent based on their privacy statement, confirm brand interest, or a combination thereof. The advertisement exchange may communicate with different parts of the system to communicate information as desired to make decisions for bidding on a user opportunity, confirming the user of different user information, using the user information, serving an advertising opportunity, consummating the transaction by moving money between the advertisement, the exchange, and/or the user.

In an exemplary embodiment, once the advertisement is served to the user, the ad exchange may have the brand ID and the user ID and can facilitate payment by the brand for the advertisement opportunity and/or reward back to the user. According to embodiments described herein, the reward back to the user may be a direct deposit into a direct deposit account of the user or in providing a rewards or incrementing some rewards points or rewards system managed or held by the brand.

In an exemplary embodiment the use of brand id, user id, publisher id, or a combination thereof may be used in the communication link with the brands and the tracking of the actions of the user. A privacy layer may therefore be created between the actions of the user on the internet, such as when they listen to music, visit a website, purchase a ticket, etc., and the transactions that are logged for the reimbursement for the engagement with the user.

Figure 6:
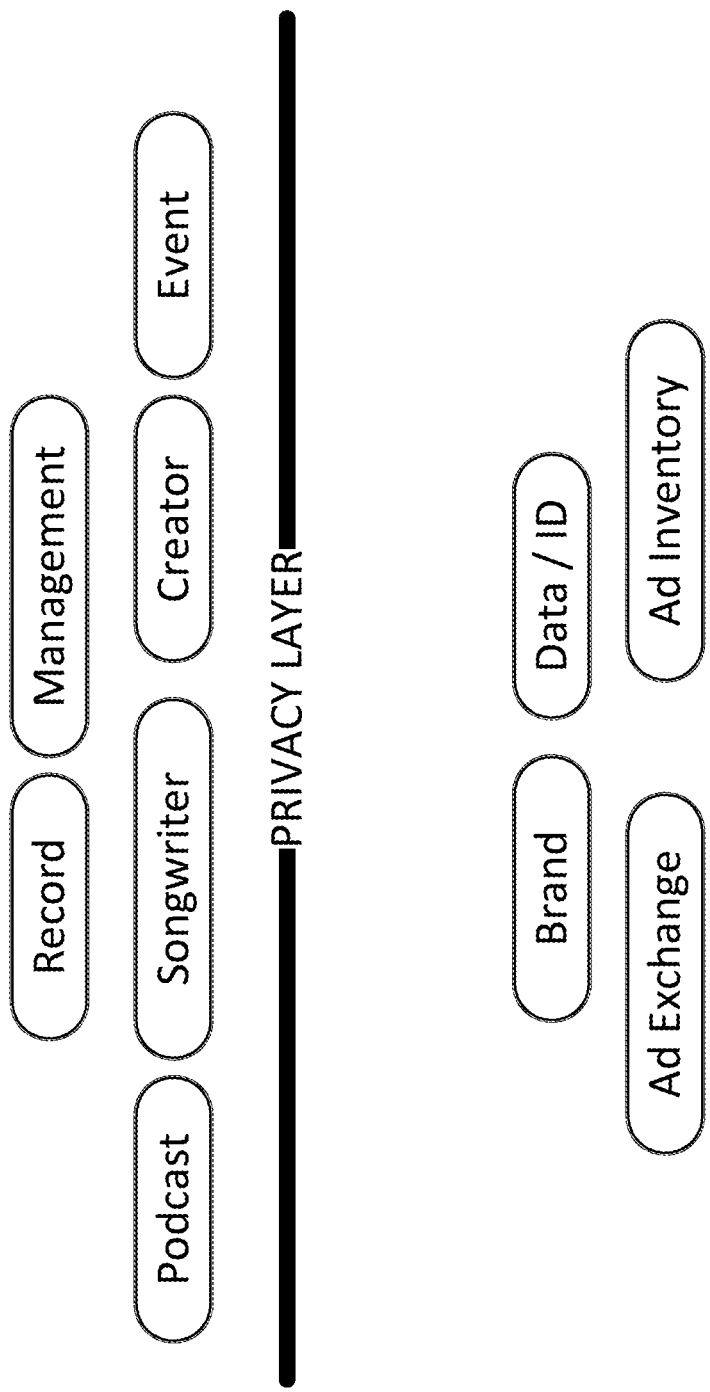
FIG. 6 illustrates an exemplary privacy separation of features according to exemplary embodiments of the present disclosure.

FIG. 6 illustrates an exemplary privacy separation between the user and the tracking of the engagements with the user as described herein. Above the privacy layer are the actual activities of the user. The user and the user's systems may track the information or activities of the user on their own device. This personal tracking is private to the user. For example, the user may keep private, browser histories, fillable form information, actions on the network, songs played, podcasts played, websites visited, links clicked, videos watched, etc. The actual engagement with a brand may also be privately recorded by the brand. For example, as the user clicks or traverses a website, the company associated with the website may track or record information associated with the user. However, the brand and the user information is held privately by either side of the exchange. When an advertisement opportunity is encountered, a brand may bid on the user the publisher identifier and/or user identifier. This permits the brand to identify the user and associate a value to that user. The brand can then bid on the exchange for that user and create an engagement with that user. With the engagement, the transaction is recorded in the user log to assign a value, payor, and payee to the engagement. Although used in terms of a monetary payor and payee, the disclosure is not so limited and the payor may be the entity, brand, etc. that is providing value to the user payee, the user, in order to receive the engagement such as an advertisement placement.

As described in exemplary embodiments of the present disclosure, the systems and methods described herein may use a combination of decentralized and centralized storage using onchain and offchain blockchain or public and private ledgers for recording information as described herein. In an exemplary embodiment, a onchain or a public ledger may comprise an entry into a blockchain that is updated while maintaining the integrity of the data being written. The public ledger, or onchain, entries may be visible and/or accessible to the public and/or brands, as well as the user. The private ledger, or offchain, entries may be visible and/or accessible only the user and/or select other users, but not the general public or open to any brand. The private ledger may be accessible through individual keys owned by those that have access or by the user. The offchain, or private ledgers may be stored centrally at a computer or device of the user, or location that is managed or allotted to the user, such as dedicated server space and/or memory space of a device of the user.

Figure 7:
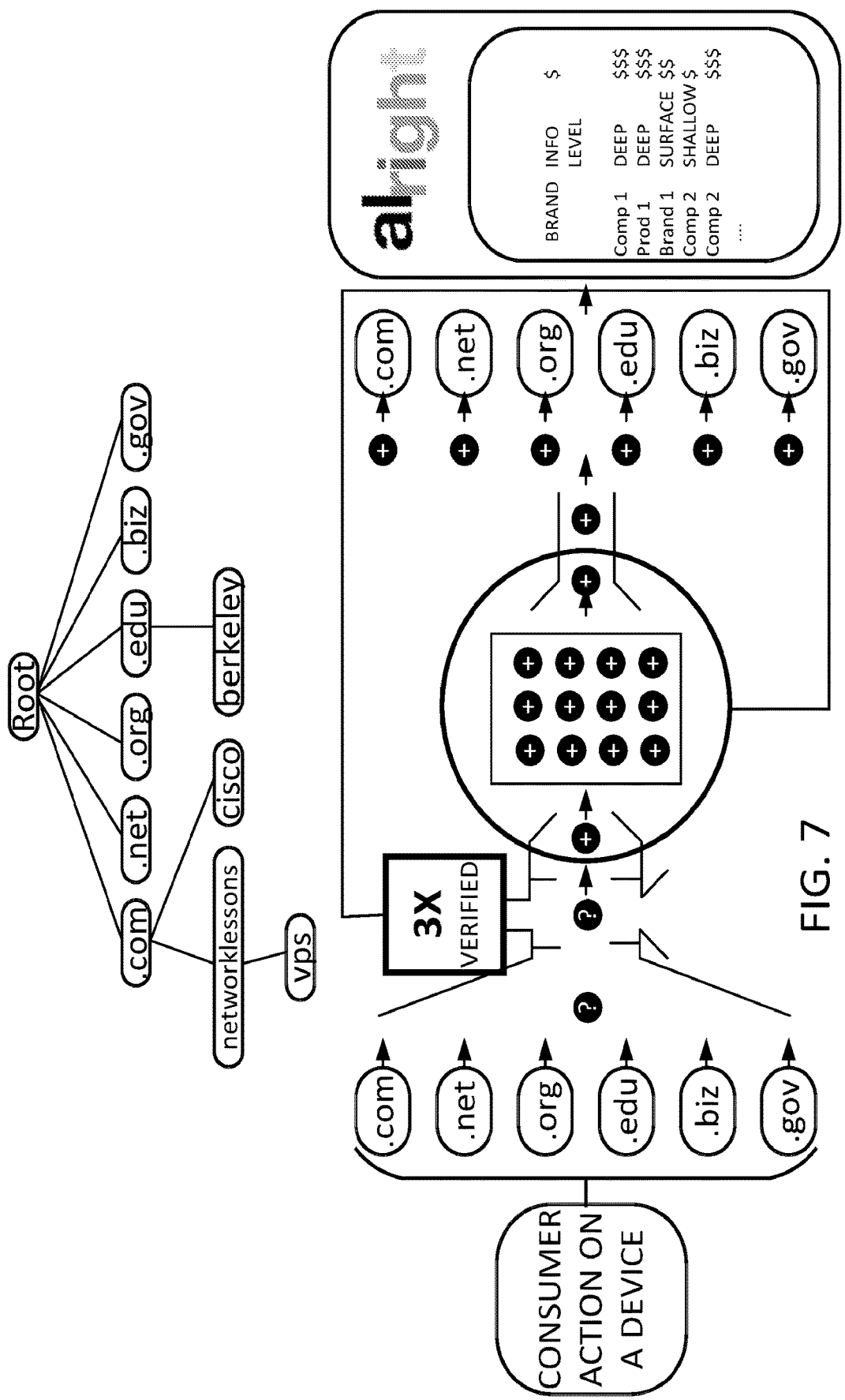
FIG. 7 illustrates an exemplary method of data handling according to exemplary embodiments of the present disclosure.

FIG. 7 illustrates an exemplary system using a DNS hierarchy in order to manage the information provided herein. Exemplary embodiments may use the brand id, user id, or publisher id to make associations within the URL itself. For example, the brand id and user id may be passed with the domain within a URL. The identifier may be appendix as suffixes or pre-fixes to the domain name of the URL.

Although domains are provided herein as the exemplary communication interface using a web browser, other communication paths are also contemplated herein. For example, exchanges or communications with devices, smart appliances, billboards, screens, etc. The communication may provide addressing, data packets, headers, etc. to transmit the user id, brand id, and/or publisher id as described herein in order to associate the user and the brand for tracking the engagement.

Exemplary embodiments of the systems and methods described herein reference individual modules or system components for performing the functions described herein. The illustrated modules and system components are exemplary only and may be separated, divided, combined, added, removed, or otherwise reorganized. For example, although the exchange is shown and described as having a number of functions including managing the bidding opportunities of brands for user, analyzing pricing information for valuing bid opportunities, managing payment to the user for use of their data, confirming compliance with user policy statements, filtering advertising opportunities based on user policy statements, and combination of these features may be handled by the exchange, while other features may be handled by different modules of the system or by additional modules of the system performing those functions.

Exemplary embodiments described herein may permit an entity (otherwise referred to herein as publisher, brand, entity, or company) desiring to engage the consumer to track the impressions provided to a user. The entity (publisher, brand, entity, product, or company) may be defined at varying levels of granularity. For example, at its broadest and most generic identification level, the publisher may simply be the entity that is trying to reach the user and in which will pay the user for receiving an impression. For example, a company that houses many different brands, may have a single brand identifier across all of its brands. However, in some instances, companies may want to distinguish spends based on different portions of the company or on different brands within the company. The Brand ID in this instant and the associated Publisher ID that is related to a brand may therefore be across the different brands within a given company. The brand may also be at an individual product level. However, the more granular the distinction of the brand identifier, the more likely that associations can be made between repetitive actions on the ledger and the itemized actions of the user. Exemplary embodiments may therefore permit publishing on an open ledger of the higher level identifier, while the brand can track on a private ledger the individual spends at a more granular level.

Exemplary embodiments described herein may use an open ledger infrastructure for permitting a user to create and/or save to the open ledger a smart policy statement, track engagement between brands and a user, track awards/monetary value associated with engagements, or a combination thereof. Exemplary embodiments of the system and method comprise creating one or more smart contract and/or one or more open ledgers that may govern that user's privacy, exchanges with a brand, values, payments, etc., as described herein. When the smart contract is entered into a block chain, companies and other third parties working in conjunction with the company holding the smart contract with the user are able to look up and follow the requests of the user. Others may also have access to the agreement to be able to hold companies in contract with the user accountable for the person that visited the site, and how they would like their data to be processed, and whether the user gets value for the user of their data.

Exemplary embodiments may include public and/or private chains, depending on how either the user and/or the company in contract with the individual user would like to work. This allows for maximum flexibility as different roll ups and roll downs take place.

Exemplary embodiments of the present disclosure may be directed to a method and a system for promotional advertisements by behavioral targeting based on user data. The disclosed techniques provide for gathering, recording, and developing behavioral attributes of users viewing content over the internet while protecting user privacy and providing compliance with legal or policy mandated privacy provisions.

Figure 8:
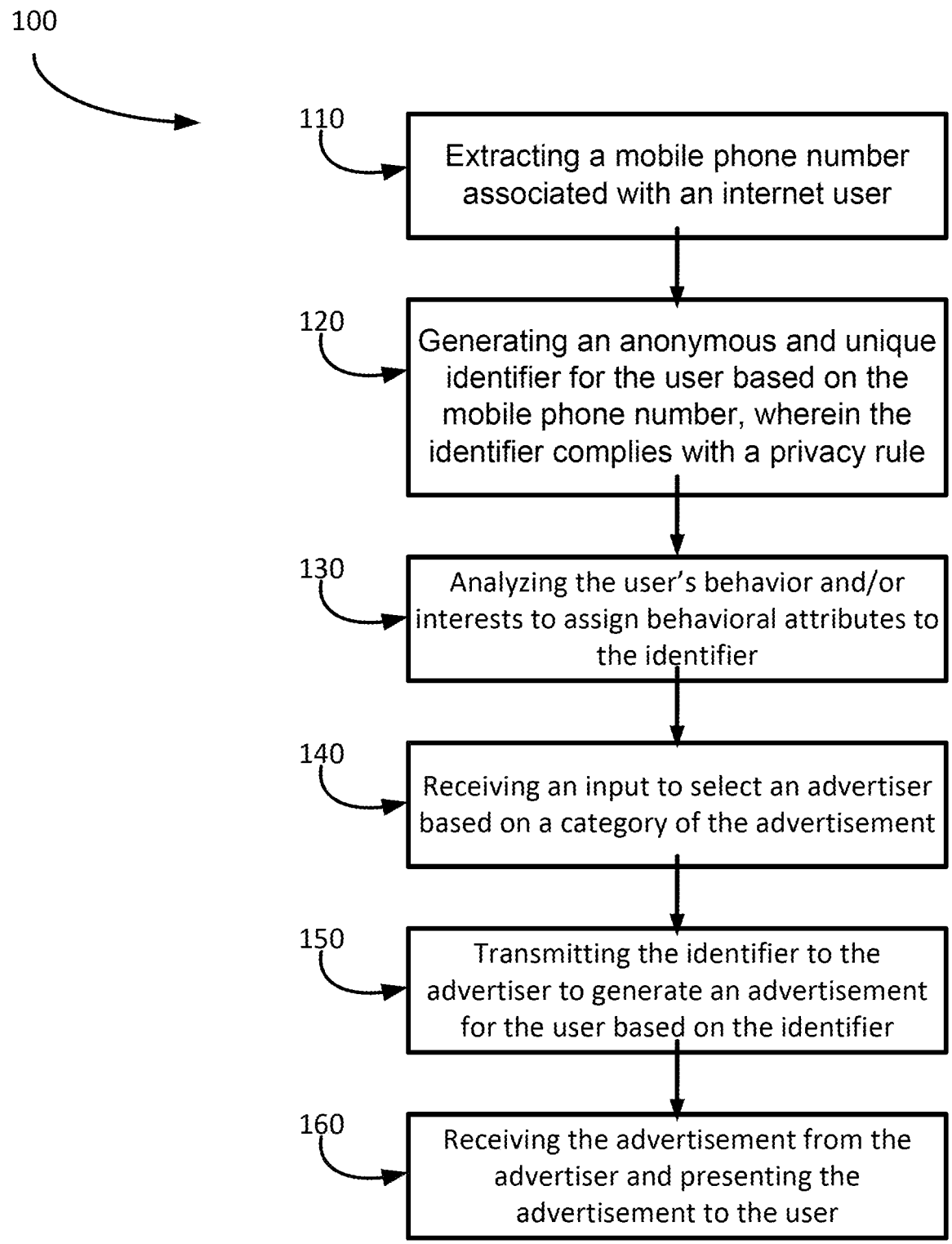
FIG. 8 shows a flowchart for monetizing advertisement according to an exemplary embodiment of the present disclosure.

FIG. 8 shows a flowchart for a method 100 for presenting advertisements based on user data. The method 100 can include a step 110 of extracting a mobile phone number associated with an internet user. An internet user, as used herein, can refer to a user of any website (e.g. Twitter, Facebook, etc.), application (e.g. podcasts), smartphone device with internet capability or similar electronic means to create and share information, ideas, personal messages, and other content (including, without limitation, text, photos and videos) on the internet or to participate in social networking.

Exemplary embodiments described herein may include techniques including, but are not limited to, Octoparse (as described in https://medium.com/dataseries/how-to-extract-data-from-twitter-without-coding-92381e3298b8), LetsExtract Email Studio (as described in https://letsextract.com/extract-emails-from-twitter.htm), Decentralized Society: Finding Web3's Soul (available at https://ssrn.com/abstract=4105763), Blockchain Idealisms (available at https://jsidhu.medium.com/blockchain-idealisms-b61c5781ddc3), each of which are incorporated by reference herein.

The method 100 can include a step 120 of generating an anonymous and unique identifier (e.g. an anonymous and unique token) for the user based on the mobile phone number.

In an example embodiment, the identifier may comply with a privacy rule. The privacy rule can be based on the jurisdiction where the method 100 is being implemented or utilized. For example, in Europe the privacy rule can be General Data Protection Regulation (GDPR), in California, the privacy rule can be the California Consumer Privacy Act (CCPA). Of course, these examples of privacy rule are merely illustrative and non-limiting.

The method 100 can include a step 130 of analyzing the user's behavior and/or interests to assign behavioral attributes to the identifier. The user's behavior and/or interest can be analyzed based on the user's posts and activity on one or more social media sites, or any other action taken by the user that may generate data on the internet. In an example embodiment, a crawler application may track the user to one or more social media sites and copy the user's posts and other activity to a storage location. The crawler application can track the information the user posts to any website or application. The crawler application can track the information the user views on the internet. The crawler application can also listen/view/monitor the posts of the user's connections.

The data generated by the user can be tracked by the crawler application using delegated authorization to access the social media sites and act on behalf of the user. Known authentication and authorization protocols, such as OAuth WRAP, or OAuth 2.0 can be used. After the authentication and authorization is complete, data generated by the user may be tracked.

A behavior analysis algorithm thereafter may analyze the posts and activity to detect behavioral attributes of the user. For example, the user may have taken an interest in a particular topic such as a new song, album or artist. It could be a current event. It could be a new friendship, or field of study. It could be a wide variety of other topics related to any subject in which the user is interested. This interest may be expressed, for example, in the user's posts to social media sites. This interest can also, for example, be expressed based on the user's real-world actions (e.g. going to a brick and mortar store to purchase merchandize). The user may talk about the interest, or the user may upload or look for a sample of the subject matter of interest. A person of skill in the art would recognize that these are non-limiting examples of a user's behavior and interests.

An example method of detecting a trending interest can be by performing a key word search of the user's posts. Another example method can be based on the usage of hashtags in social media posts. Yet another example method can be based on a determination of the frequency with which terms in the user's posts (e.g. any publication/blog article etc.) appear. The rationale is that when the user has a trending interest, that interest will appear in the user's posts with higher frequency. Other non-limiting examples of interest can include government and politics, electronic devices, foreign policy issues, science, video games, restaurants, documentaries, science and technology, sports, movies, business news, cuisine, etc.

The user's behavioral attributes can also be based on generalized personality traits such as gender, age, or net worth, etc. The user may share the behavioral attributes with other users, e.g., a set of users having a shared experience (such as the students of an academic class) or a shared interest (such as an appreciation for a particular genre of music), a social clique (such as a highly interconnected set of users), an organization, a shared interest in a product, the products of a vendor, or a product area. After the behavioral attributes have been detected, they can be assigned to the identifier (as discussed previously in step 120) for the user, thereby maintaining privacy of the user.

The method 100 can include a step 140 of receiving an input to select an advertiser based on a category of the advertisement. In an example embodiment, the input can be received from a media buyer. As used herein, the media buyer can be an entity (e.g. a machine learning algorithm) that purchases advertisements based on the user's behavioral attributes, as described previously in step 130 For example, the category of the advertisement can be sport footwear, insurance, technology, video games, gambling, etc.

The method 100 can include a step 150 of transmitting the identifier to the advertiser to generate an advertisement for the user. The identifier contains information regarding behavioral attributes of the user. The behavioral attributes can be sensitive data that are substituted with a non-sensitive equivalent, i.e., the identifier, which can map back to the sensitive data through an identifier mapping system. The mapping from original data (e.g. behavioral attributes) to an identifier may use methods (e.g. cryptography) that render identifiers infeasible to reverse in the absence of the identifier system (e.g. using identifiers created from random numbers). Therefore, to the advertiser, information regarding the behavioral attributes are presented as an anonymous information because the identifier can be an anonymous and unique data entity, thereby complying with privacy rules in a jurisdiction.

The method 100 can include a step 160 of receiving the advertisement from the advertiser, the advertisement being based on the identifier, and presenting the advertisement to the user. The advertiser can generate the advertisement by tailoring it to the behavioral attributes found in the identifier. The advertisement can be in the form of any combination of video, audio, images, text, etc. In an example embodiment, the format of the advertisement can be based on the preferences of the user. The format can also be based on the medium (e.g. tablets, phone apps, TV, digital billboard, etc.) on which it is displayed. The presenting the advertisement to the user can generate income for the user based on the number of times the presenting occurs. In an example embodiment, income generated from the monetizing can be stored in a payment mechanism, e.g., a blockchain based wallet.

The advertisement can be stored in various known forms such as a relational database, cloud database, in-memory database, etc. The database can utilize improved data structures having prioritized form fields which provide for more efficient use of computing resources, including more efficient use of the processor, memory and network communications.

The database can be in the form of a distributed ledger (e.g. blockchain) distributed among the multiple agents on a peer-to-peer network. Blockchain, as used herein, can be a ledger of all transactions of a blockchain-based data storage. One or more computing devices may comprise a blockchain network, which may be configured to process and record transactions as part of a block in the blockchain. Once a block is completed, the block can be added to the blockchain and the transaction record is thereby updated.

Figure 9:
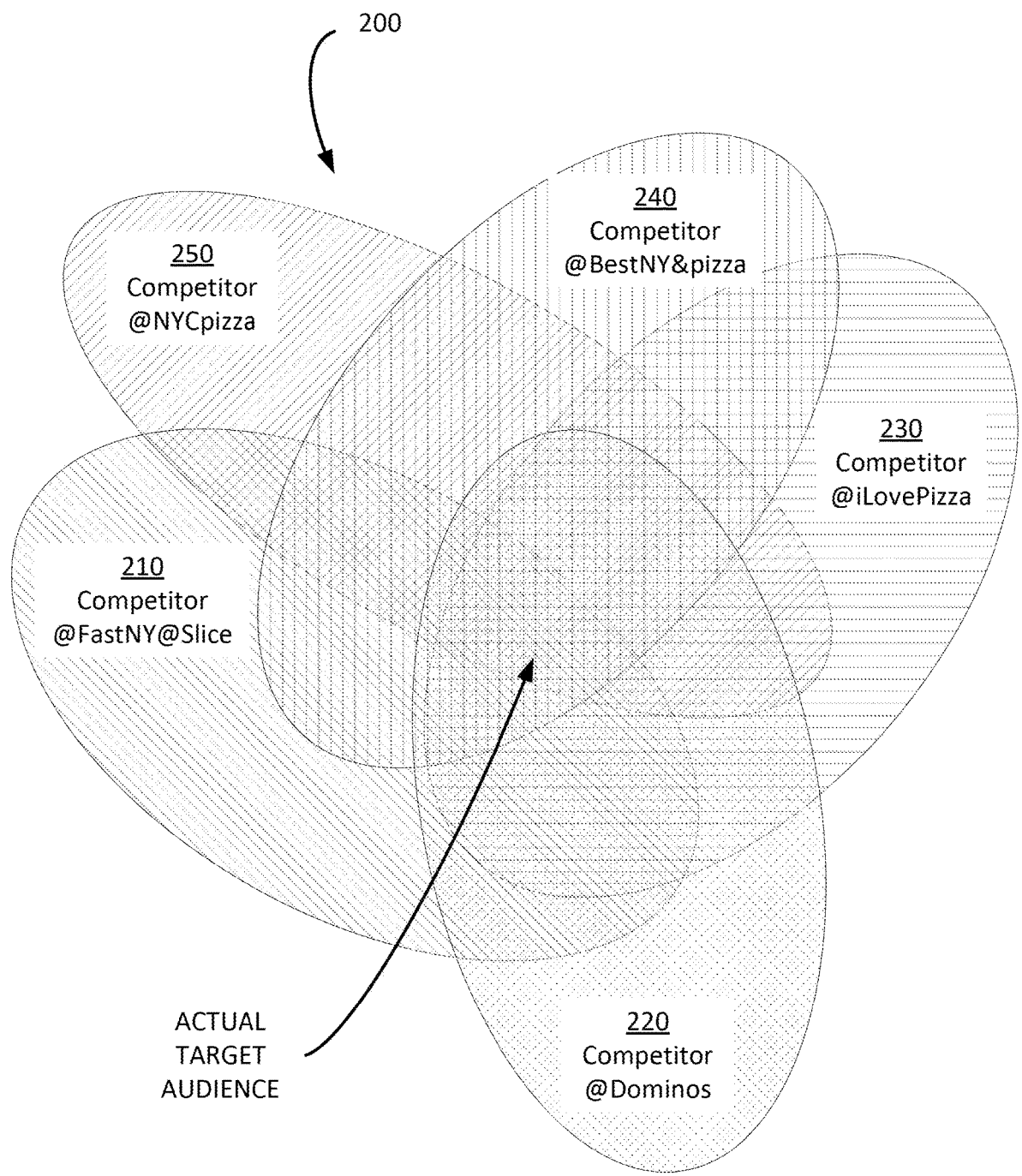
FIG. 9 shows a zone layer, value layer and output layer according to an exemplary embodiment of the present disclosure.

FIG. 9 shows a Venn diagram 200 illustrating an example embodiment where a hashtag can be used to analyze behavioral attributes, as previously discussed in step 130. The Venn diagram 200 has five different hash tags: @fastNYslice

210, @Dominos 220, @iLovePizza 230, @BestNYCpizza 240, @NYCpizza 250. While all these hash tags (210-250) indicate competing pizza restaurants, any user tweeting such hashtags suggests that the user has interest in pizza, the cross over area indicated as the "actual target audience". This interest can provide information regarding the behavioral attributes of the user.

Furthermore, the location from which these hashtags are tweeted (e.g. in case when Twitter is the social media), the number chimes, the frequency of such tweets, the time of the day, the day of the week, etc. can also provide information regarding the behavioral attributes of the user.

Figure 10:
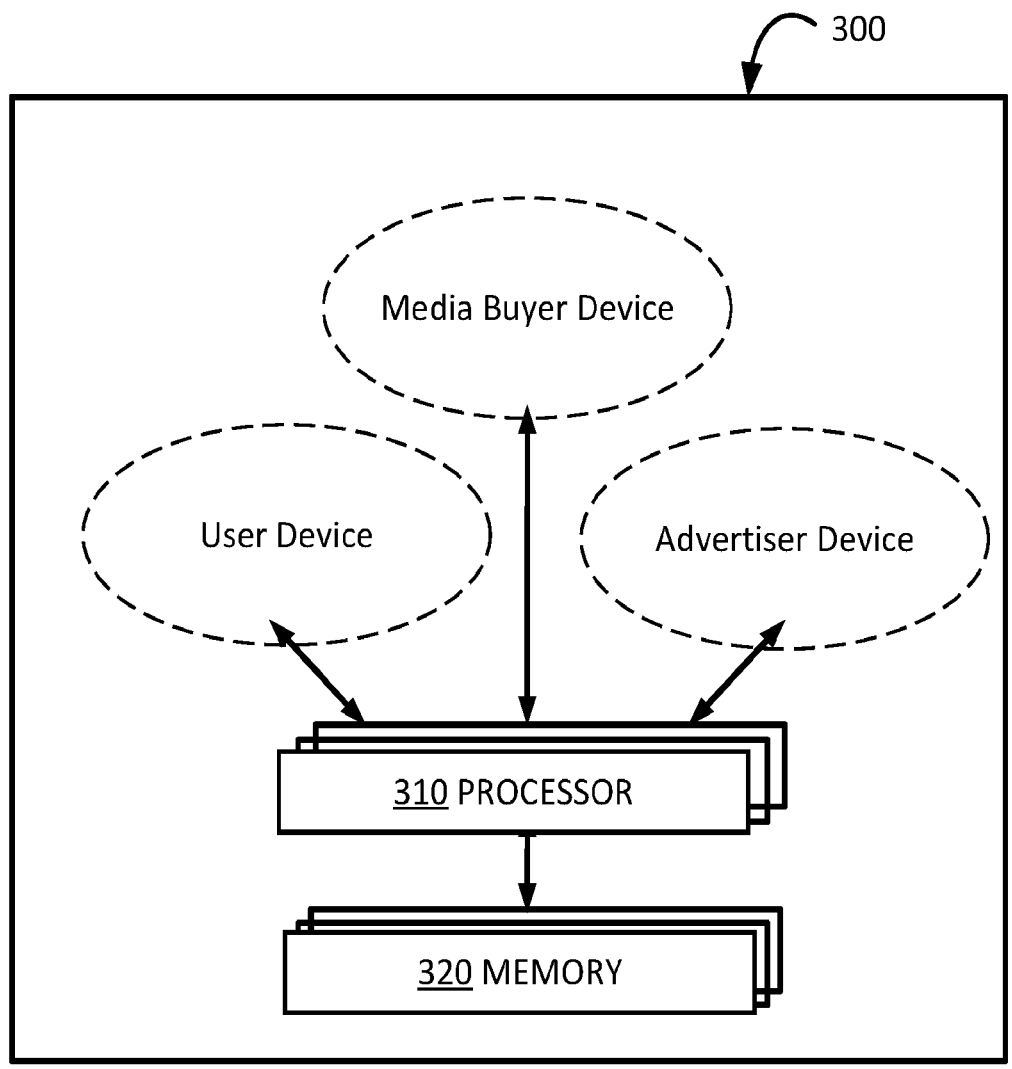
FIG. 10 shows a system for monetizing advertisement according to an exemplary embodiment of the present disclosure.

FIG. 10 shows a system diagram 300 for presenting advertisements based on user data. The system 300 can include one or more processor(s) 310 and one or more associated memories 320. The one or more memories 320 may have non-transitory computer readable instructions stored thereon that when executed by the processor 310 may be configured to extract a mobile phone number associated with an internet user. This is similar to the step 110 of the previously described method 100.

In an example embodiment, the computer readable instructions stored in the one or more memories 320 and executed by the one or more processors 310 can be configured to generate an anonymous and unique identifier for the user based on the mobile phone number, wherein the identifier complies with a privacy rule. This is similar to the step 120 of the previously described method 100.

In an example embodiment, the computer readable instructions stored in the one or more memories 320 and executed by the one or more processors 310 can be configured to analyze the user's behavior and/or interests to assign behavioral attributes to the identifier. This is similar to the step 130 of the previously described method 100. The processor 310 can be configured to receive an input to select an advertiser based on a category of the advertisement. This is similar to the step 140 of the previously described method 100.

In an example embodiment, the computer readable instructions stored in the one or more memories 320 and executed by the one or more processors 310 can be configured to transmit the identifier to the advertiser to generate an advertisement for the user based on the identifier. This is similar to the step 150 of the previously described method 100. The processor 310 can be configured to receive the advertisement from the advertiser and present the advertisement to the user. This is similar to the step 160 of the previously described method 100.

Figure 11:
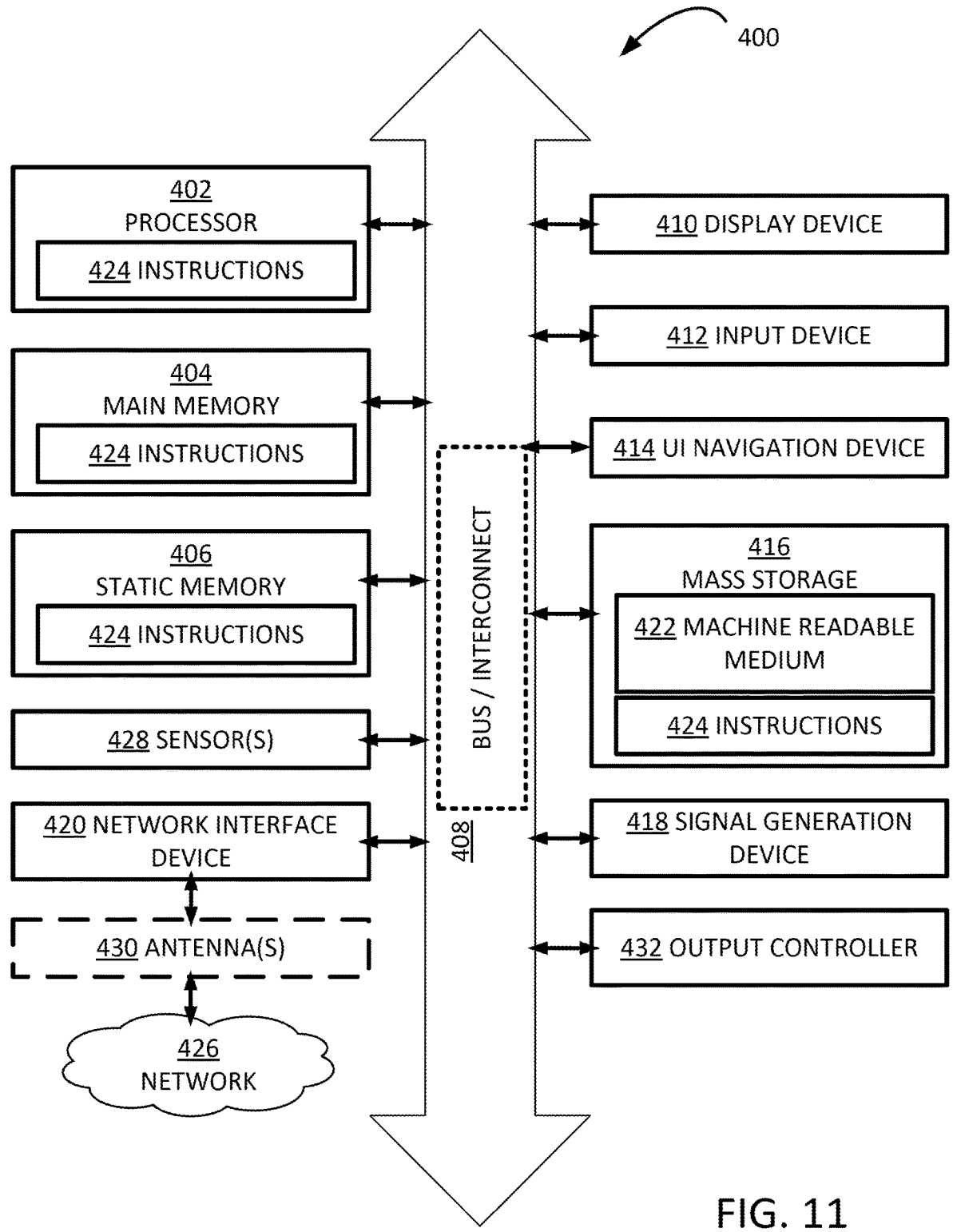
FIG. 11 is a block diagram illustrating an exemplary computer system according to an exemplary embodiment of the present disclosure.

FIG. 11 is a block diagram illustrating an example computer system 400 upon which any one or more of the methodologies (e.g. method 100 and/or system 300) herein discussed may be run according to an example described herein. Computer system 400 may be embodied as a computing device, providing operations of the components featured in the various figures, including components of the system 300, method 100, or any other processing or computing platform or component described or referred to herein.

In alternative embodiments, the computer system 400 can operate as a standalone device or may be connected (e.g., networked) to other machines. In a networked deployment, the computing system 400 may operate in the capacity of either a server or a client machine in server-client network environments, or it may act as a peer machine in peer-to-peer (or distributed) network environments.

Example computer system 400 includes a processor 402 (e.g., a central processing unit (CPU), a graphics processing unit (GPU) or both), a main memory 404 and a static memory 406, which communicate with each other via an interconnect 408 (e.g., a link, a bus, etc.). The computer system 400 may further include a video display unit 410, an input device 412 (e.g. keyboard) and a user interface (UI) navigation device 414 (e.g., a mouse). In one embodiment, the video display unit 410, input device 412 and UI navigation device 414 are a touch screen display. The computer system 400 may additionally include a storage device 416 (e.g., a drive unit), a signal generation device 418 (e.g., a speaker), an output controller 432, and a network interface device 420 (which may include or operably communicate with one or more antennas 430, transceivers, or other wireless communications hardware), and one or more sensors 428.

The storage device 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404, static memory 406, and/or within the processor 402 during execution thereof by the computer system 400, with the main memory 404, static memory 406, and the processor 402 constituting machine-readable media.

While the machine-readable medium 422 (or computer-readable medium) is illustrated in an example embodiment to be a single medium, the term "machine-readable medium" may include a single medium or multiple medium (e.g., a centralized or distributed database, and/or associated caches and servers) that store the one or more instructions 424.

The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions.

The term "machine-readable medium" shall accordingly be taken to include, but not be limited to, solid-state memories, optical media, magnetic media or other non-transitory media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 424 may further be transmitted or received over a communications network 426 using a transmission medium via the network interface device 420 utilizing any one of several well-known transfer protocols (e.g., HTTP). Examples of communication networks include a local area network (LAN), wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that can store, encoding, or carrying instructions for execution by the machine, and includes digital or analog communications signals or other intangible medium to facilitate communication of such software.

Other applicable network configurations may be included within the scope of the presently described communication networks. Although examples were provided with reference to a local area wireless network configuration and a wide area Internet network connection, it will be understood that communications may also be facilitated using any number of personal area networks, LANs, and WANs, using any combination of wired or wireless transmission mediums.

The embodiments described above may be implemented in one or a combination of hardware, firmware, and software. For example, the features in the system architecture 400 of the processing system may be client-operated software or be embodied on a server running an operating system with software running thereon. While some embodiments described herein illustrate only a single machine or device, the terms "system", "machine", or "device" shall also be taken to include any collection of machines or devices that individually or jointly execute a set (or multiple sets) of instructions to perform any one or more of the methodologies discussed herein.

Examples, as described herein, may include, or may operate on, logic or several components, modules, features, or mechanisms. Such items are tangible entities (e.g., hardware) capable of performing specified operations and may be configured or arranged in a certain manner. In an example, circuits may be arranged (e.g., internally or with respect to external entities such as other circuits) in a specified manner as a module, component, or feature. In an example, the whole or part of one or more computer systems (e.g., a standalone, client or server computer system) or one or more hardware processors may be configured by firmware or software (e.g., instructions, an application portion, or an application) as an item that operates to perform specified operations. In an example, the software may reside on a machine readable medium. In an example, the software, when executed by underlying hardware, causes the hardware to perform the specified operations.

Accordingly, such modules, components, and features are understood to encompass a tangible entity, be that an entity that is physically constructed, specifically configured (e.g., hardwired), or temporarily (e.g., transitorily) configured (e.g., programmed) to operate in a specified manner or to perform part or all operations described herein. Considering examples in which modules, components, and features are temporarily configured, each of the items need not be instantiated at any one moment in time. For example, where the modules, components, and features comprise a general-purpose hardware processor configured using software, the general-purpose hardware processor may be configured as respective different items at different times. Software may accordingly configure a hardware processor, for example, to constitute a particular item at one instance of time and to constitute a different item at a different instance of time.

Additional examples of the presently described method (e.g. 100), system (e.g. 300), and device embodiments are suggested according to the structures and techniques described herein. Other non-limiting examples may be configured to operate separately or can be combined in any permutation or combination with any one or more of the other examples provided above or throughout the present disclosure.

Figure 12:
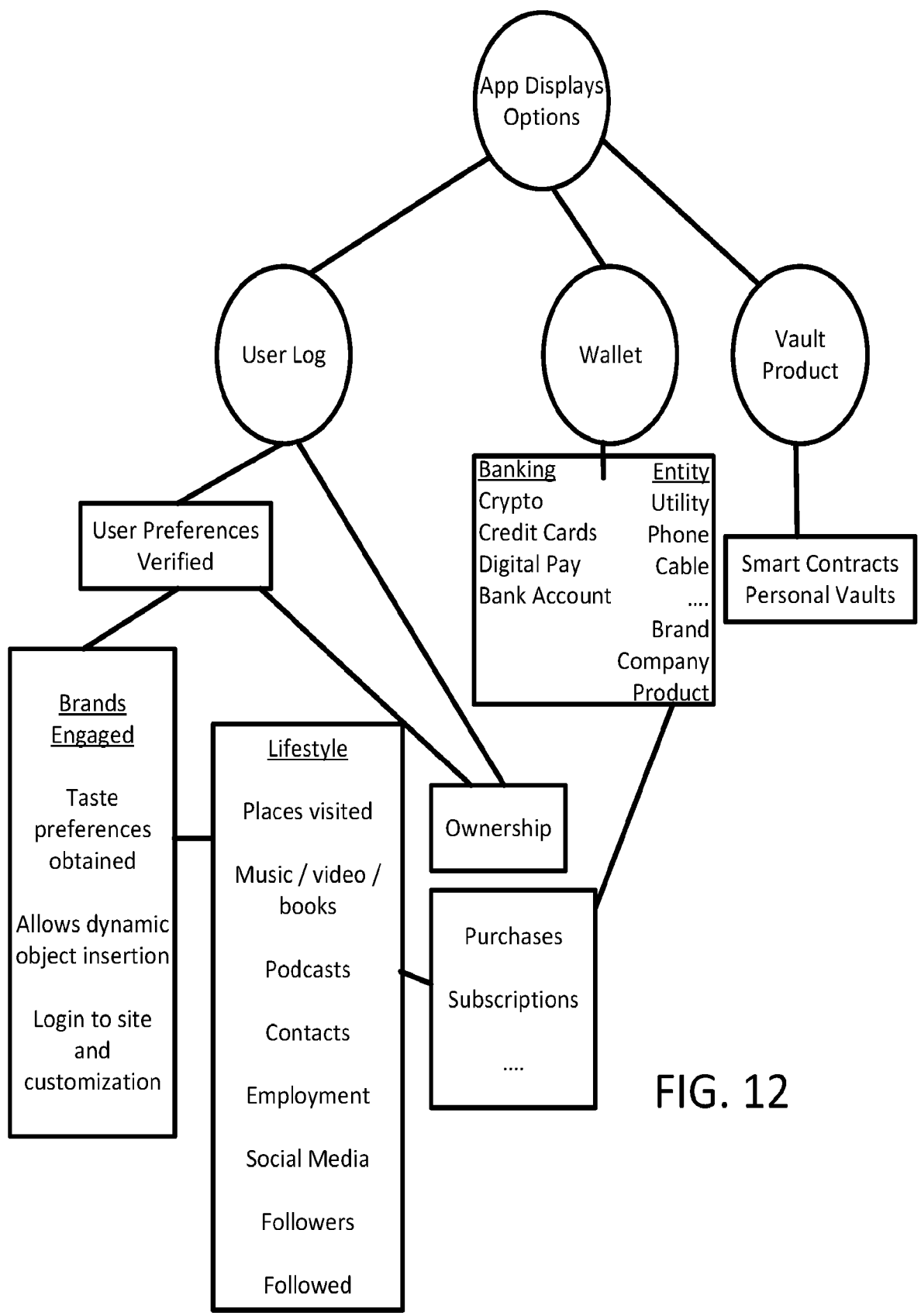
FIG. 12 is a system diagram according to exemplary embodiments of the present disclosure.

FIG. 12 illustrates an exemplary system diagram according to embodiments described herein. As illustrated, the system may include an application that can be downloaded onto a digital device, such as a mobile device, e.g. smart phone, smart watch, tablet, e-reader, laptop, etc. The application may provide a user display that provides the user options for viewing components of the system or information held by modules of the system.

As illustrated, the application may be configured to communicate and display one or more banking ledgers. The one or more banking ledgers may define a wallet of the user. As illustrated, the one or more banking ledgers may show one or more accounts, payments, debits, credits, rewards, or other transaction by or with the user. For example, the one or more banking ledgers may show account statements related to the user's monetary accounts, such as cryptocurrency accounts, credit card accounts, digital payment systems, bank accounts, etc. The one or more banking ledgers may also show other transaction, such as the utility payments of the user, which can include gas, electric, cable, phone, etc. The one or more banking ledgers may also include the credits or debits of rewards as the user is engaged by entities as described herein. In an exemplary embodiment, the data of the user based on purchases and engagement may include the user purchase, which may inform the lifestyle attributes of the user, as described herein.

As illustrated, the application may be configured to communicate with a database for maintaining the user log. The user log may be owned by a user and/or may include a hierarchical ownership, such as in cases of a minor or guardianship. The user log may communicate with system components to verify the user preferences and may communicate with the vault products described herein, which may include the one or more smart contracts and/or personal vaults of the user for retaining information of the user, including the user preference and/or entity engagement preferences. Once the user preferences are determined, the brand may (or may not) engage the user based on the user preferences. If the user has permitted engagement, then the brand may advertise to that user based on the user preferences. Exemplary embodiments of brand engagement after user authorization may include dynamic object insertion, customization of websites, customized advertisement feeds, or other product placements and/or entity engagement as described herein. From the entity engagement, different features of the user may be analyzed to determine categorization of the user for further targeted and customized advertisement. For example, the system may track the user's location, music, video, books, podcasts, contacts, employment information, social media posts and/or reads, followers, or those the user follows. The system may therefore obtain a useable, up to date, and specific data set on the user for targeted advertisement.

Exemplary embodiments of the systems and methods described herein may be used to create an integrated digital economy, where a user's personal data is stored in designated sections of their user log, wallet, and vault applications.

For example, the user log may be configured to allocate a specific space in the user application for brands and trademarks. For example, if a company is interested in customers that are interested in a specific product or product category, such as if they are purchasers of a certain cereal or soda, then the company may query the user logs to find users that match a given criteria base don their buying habits.

Because brands have access to user data, the user can be paid for access to that valuable information. Exemplary embodiments described herein may define a DAO (Decentralized Autonomous Organization) called "Ethical Data Solutions." Exemplary embodiments may permit the existence of a global consumer protection organization and also a business to business DAO focused on ethical business consumption of data.

A user's information may comprise actual, unique value based on the user's buying behavior. This behavior creates a "data asset" where each data point is valuable and has a price. Exemplary embodiments may therefore permit a user to collect data points (a sort of Data DNA). The collect data may be come an asset-backed information that can be stored in the user's very own data file in their own application. The logging of information may be used to create a transparent, private, secure, personal ecosystem.

Exemplary embodiments described herein may include a module configured to collect user data and user consents (privacy preferences). When the data is sorted, the relevant data to a user may be returned or sent to the user to be stored in the user log, a user wallet, a user vault, or combinations thereof as appropriate.

Just as stock market exchanges indicate the value of various assets, exemplary embodiments described herein may permit user data to be treated as a personal asset where the user can profit from it. Data is based on audiences' current interests, and it holds actual value.

Exemplary embodiments described herein may be used to generate clean, ethical data sets, that is controlled by the user, secured to the user, to generate better data for monetization.

Exemplary embodiments described herein may use data as a tool against poverty. Since everyone is generating information, everyone has something of value to sell within a marketplace.

Exemplary embodiments described herein may lead to better products. Advertisers, brands, and individuals will have products that are relevant to them. These products will help tailor and enrich everyone's lifestyle.

Exemplary embodiments may include smart contracts setting access to user data. Exemplary embodiments described herein may track the data of the user including, for example, the interest of the user, the location of the user, demographics, or other desirable trait, characteristics as used by advertising to determine a desirable targeted customer as described herein. The system may therefore set advertising prices for an individual user based on their current interest and relevancy to a specific brand. For example, a user currently in the market for a vehicle, may become more attractive, and therefore more valuable to companies selling cars. However, if the user just bought a car, then their value to car dealers substantially decreases. The system may provide a fluctuating value of the user related to the user's current interests and the associated brand/entity trying to advertise to them.

Exemplary embodiments of the system described herein may permit entities to bid on advertising opportunities on the most valuable potential customers. For example, a brand may put a multiplier on a bid opportunity of a user that comprises a higher value as determined by embodiments descried herein including, for example, time relevant interest, actions of the user, current browsing trends, click throughs, etc. Exemplary embodiments may include a time decay on the interest of the user so that the price for an individual user may decay over time assuming their interest in a given product or the opportunity to acquire a customer has only a limited opportunity window. The time decay may be based on the product or the advertising opportunity. For example, a user interested in buying the car, will likely spend a short window in market research before buying the car, at which time they are not in the market for some time thereafter. However, a consumer of hair care products may continually be in the market and their value may be maintained over time as their purchasing of the product may be continual. Exemplary embodiments may therefore relate and track different characteristics of the user, the product, consumer buying, conditions, attributes, etc. in order to dynamically set a price to target to an individual user. Exemplary embodiment may dynamically adjust consumer prices, for example including the location of the user, gender of the user, demographics of the user, desirability of the user, current user activities, trends, the product being marketed, the location of the user, etc. and combinations thereof.

Exemplary embodiments of the system described herein can be based in software and/or hardware. While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. The invention is to be understood as not limited by the specific embodiments described herein, but only by scope of the appended claims.

Exemplary embodiments described herein may be in terms of various embodiments of on chain and off chain and/or block chain and private ledger and/or other digital data sets. Exemplary embodiments described herein may include systems and methods to include any combination of the centralized storage, decentralized storage, public ledger, private ledger, block chain, etc, and remain within the scope of the instant application. Exemplary embodiments may be used to permit the communication across different digital storage types that may still confirm the identity of the user, preserve the user preferences, comply with data privacy, or a combination thereof. Therefore, each may communicate with different data sets and interface with different digital data sets that may be held or used by different entities, including the user.

As used herein, the terms "about," "substantially," or "approximately" for any numerical values, ranges, shapes, distances, relative relationships, etc. indicate a suitable dimensional tolerance that allows the part or collection of components to function for its intended purpose as described herein. Numerical ranges may also be provided herein. Unless otherwise indicated, each range is intended to include the endpoints, and any quantity within the provided range. Therefore, a range of 2-4, includes 2, 3, 4, and any subdivision between 2 and 4, such as 2.1, 2.01, and 2.001. The range also encompasses any combination of ranges, such that 2-4 includes 2-3 and 3-4.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. Specifically, exemplary components are described herein. Any combination of these components may be used in any combination. For example, any component, feature, step or part may be integrated, separated, sub-divided, removed, duplicated, added, or used in any combination and remain within the scope of the present disclosure. Embodiments are exemplary only, and provide an illustrative combination of features, but are not limited thereto.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

It should be noted that the terms "including" and "comprising" should be interpreted as meaning "including, but not limited to". If not already set forth explicitly in the claims, the term "a" should be interpreted as "at least one" and "the", "said", etc. should be interpreted as "the at least one", "said at least one", etc. Furthermore, it is the Applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A computer-implemented method for verifying an identity of a user operating a user device and tracking interactions with a public network by the user device, using a public ledger and a private ledger, where the interactions by the user device are written to the private ledger, information presented by an entity to the user device is written to the private ledger, and rules for presenting the information to the user device is written to the public ledger, where the rules for presenting the information to the user device are to be used by an advertiser for filtering a presentation of advertisements to the user device, the method comprising:
   extracting a mobile phone number, network user history, application user history, and device use history associated with the user operating the user device;
   initiating an authentication process to verify the identity of the user operating the user device by cross-referencing the network user history, the application user history, and the device use history with public data on the user;
   generating an anonymous and unique identifier for the internet user based on the mobile phone number and the authentication process to verify the identity of the user;
   writing the mobile phone number, the network user history, the application user history, and the device use history associated with the user operating the user device to the private ledger;
   upon completing the authentication process to verify the identity of the user, permitting the user to create a personalized privacy policy defined in rules for storing data of the user and using data of the user by entities;
   receiving, via a user interface of the user device, feature selections of the user;
   writing the feature selections associated with the user operating the user device to the private ledger;
   additionally storing the feature selections of the user as the personalized privacy policy in the public ledger, wherein the personalized privacy policy is stored in the public ledger accessible by the advertiser for filtering the presentation of advertisements to the user device;
   transmitting the anonymous and unique identifier to the advertiser to generate an advertisement for the user based on the anonymous and unique identifier; and
   receiving the advertisement from the advertiser and presenting the advertisement to the user.

2. The method of claim 1, further comprising:
   assigning behavioral attributes to the anonymous and unique identifier, wherein the behavioral attributes include at least one of gender, age, or net worth of the user.

3. The method of claim 1, wherein the anonymous and unique identifier complies with a privacy rule, and the privacy rule includes General Data Protection Regulation (GDPR) and/or California Consumer Privacy Act (CCPA) rules.

4. The method of claim 1, wherein the advertisement corresponds with a category, and the category comprises at least one of alcohol, insurance, fast food, footwear, mobile technology, automotive, or video games.

5. The method of claim 1, wherein the network user history is obtained by utilizing a crawler application to track the user across multiple websites.

6. The method of claim 1, further comprising:
   receiving an input to select the advertiser based on a category of the advertisement, wherein the input to select the advertiser is received from a media buyer.

7. The method of claim 1, wherein the advertisements are generated by tailoring it to the behavioral attributes.

8. The method of claim 1, wherein a format of the advertisements are one or more of video, audio, images, or text.

9. The method of claim 8, wherein the format of the advertisements are based on stored preferences of the user.

10. The method of claim 8, wherein the format of the advertisements are based on a display medium being employed by the user.

11. A system for verifying an identity of a user operating a user device and tracking interactions with a public network by the user device, using a public ledger and a private ledger, where the interactions by the user device are written to the private ledger, information presented by an entity to the user device is written to the private ledger, and rules for presenting the information to the user device is written to the public ledger, where the rules for presenting the information to the user device are to be used by an advertiser for filtering a presentation of advertisements to the user device, the system comprising a processor and an associated memory, the processor configured to:
   extract a mobile phone number, network user history, application user history, and device use history associated with the user operating the user device;
   initiate an authentication process to verify the identity of the user operating the user device by cross-referencing the network user history, the application user history, and the device use history with public data on the user;
   generate an anonymous and unique identifier for the internet user based on the mobile phone number and the authentication process to verify the identity of the user;
   write the mobile phone number, the network user history, the application user history, and the device use history associated with the user operating the user device to the private ledger;
   upon completing the authentication process to verify the identity of the user, permit the user to create a personalized privacy policy defined in rules for storing data of the user and using data of the user by entities;

receive, via a user interface of the user device, feature selections of the user;
write the feature selections associated with the user operating the user device to the private ledger;
additionally store the feature selections of the user as the personalized privacy policy in the public ledger, wherein the personalized privacy policy is stored in the public ledger accessible by the advertiser for filtering the presentation of advertisements to the user device;
transmit the anonymous and unique identifier to the advertiser to generate an advertisement for the user based on the anonymous and unique identifier; and
receive the advertisement from the advertiser and present the advertisement to the user.

12. The system of claim 11, wherein the processor is further configured to:
assign behavioral attributes to the anonymous and unique identifier, the behavioral attributes include at least one of gender, age, or net worth of the user.

13. The system of claim 11, wherein the anonymous and unique identifier complies with a privacy rule, and the privacy rule includes General Data Protection Regulation (GDPR) and/or California Consumer Privacy Act (CCPA) rules.

14. The system of claim 11, wherein the advertisement corresponds with a category, and the category comprises at least one of alcohol, insurance, fast food, footwear, mobile technology, automotive, or video games.

15. The system of claim 11, wherein the network user history is obtained by utilizing a crawler application to track the user across multiple websites.

16. The system of claim 11, wherein the processor is further configured to:
receiving an input to select the advertiser based on a category of the advertisement, wherein the input to select the advertiser is received from a media buyer.

17. The system of claim 11, wherein the advertisements are generated by tailoring it to the behavioral attributes.

18. The system of claim 11, wherein a format of the advertisements are one or more of video, audio, images, or text.

19. The system of claim 18, wherein the format of the advertisements are based on stored preferences of the user.

20. The system of claim 18, wherein the format of the advertisements are based on a display medium being employed by the user.

* * * * *